United States Patent [19]

Horton

[11] Patent Number: 4,506,493

[45] Date of Patent: Mar. 26, 1985

[54] CASE PACKER

[75] Inventor: Richard Horton, Falmouth, Va.

[73] Assignee: Duron, Inc., Beltsville, Md.

[21] Appl. No.: 514,521

[22] Filed: Jul. 18, 1983

[51] Int. Cl.³ .................... B65B 35/44; B65B 57/10
[52] U.S. Cl. .................................... 53/499; 53/543;
53/247; 53/248; 53/251
[58] Field of Search ............... 53/539, 543, 535, 496,
53/498, 499, 247, 248, 249, 251

[56] References Cited

U.S. PATENT DOCUMENTS

| | | |
|---|---|---|
| 2,540,743 | 2/1951 | Leach . |
| 2,571,790 | 10/1951 | Tomkins ................ 53/543 |
| 2,713,448 | 7/1955 | Wimmer et al. . |
| 2,748,550 | 6/1956 | Soldner . |
| 2,756,553 | 7/1956 | Ferguson et al. . |
| 2,815,623 | 12/1957 | Holstebroe et al. . |
| 2,939,256 | 6/1960 | Nigrelli et al. . |
| 3,160,259 | 12/1964 | Dalton . |
| 3,209,512 | 10/1965 | Ferguson, Jr. et al. . |
| 3,212,227 | 10/1965 | Chidsey, Jr. et al. . |
| 3,224,549 | 12/1965 | Cella et al. . |
| 3,284,985 | 11/1966 | Roth . |
| 3,311,217 | 3/1967 | Muhlenbruch ........... 53/543 X |
| 3,353,331 | 11/1967 | Rowekamp . |
| 3,431,702 | 3/1969 | Spaulding ................. 53/543 X |
| 3,462,912 | 8/1969 | Anderson . |
| 3,621,765 | 11/1971 | Sootheran et al. . |
| 3,653,178 | 4/1972 | Baur ....................... 53/543 |
| 3,673,756 | 7/1972 | Prete et al. . |
| 3,694,993 | 10/1972 | East . |
| 3,740,919 | 6/1973 | Heisler . |
| 3,848,394 | 11/1974 | Heisler . |
| 3,979,878 | 9/1976 | Berney . |
| 4,089,150 | 5/1978 | Heisler . |

*Primary Examiner*—Horace M. Culver
*Attorney, Agent, or Firm*—Dennison, Meserole, Pollack & Scheiner

[57] ABSTRACT

A case packing system, including apparatus and method, wherein cans or like products are introduced to an accumulator in a generally random single file, collected in multiple rows or lanes, and loaded into cartons or cases. Limit means associated with the accumulator define removable abutments against which the leading cans, in the several rows, engage. Switches are provided for sensing the presence of the completed group of cans defined by the multiple rows and, in response thereto, effecting a retraction of the limit means. The accumulator is followed by an infeed belt which introduces the grouped multiple rows of cans into a packing station and onto a pair of support panels mounted for vertical pivoting for a downward discharge of the cans into a subjacent case. Empty cases are conveyed sequentially into the packing station in underlying relation to the panel supported cans. The introduction of a single case is sensed and, in response thereto, the case is elevated to immediately underlie the support panels. The elevation of the case triggers a release of the panels for discharge of the cans downward into the case. The loaded case is lowered and, through operation of an underlying roller drive means, is discharged from the packing station, triggering a switch which allows for the release of a following case and a continuing of the operational sequence.

36 Claims, 31 Drawing Figures

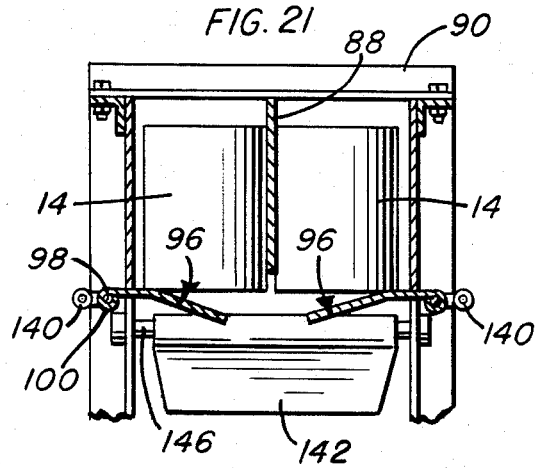
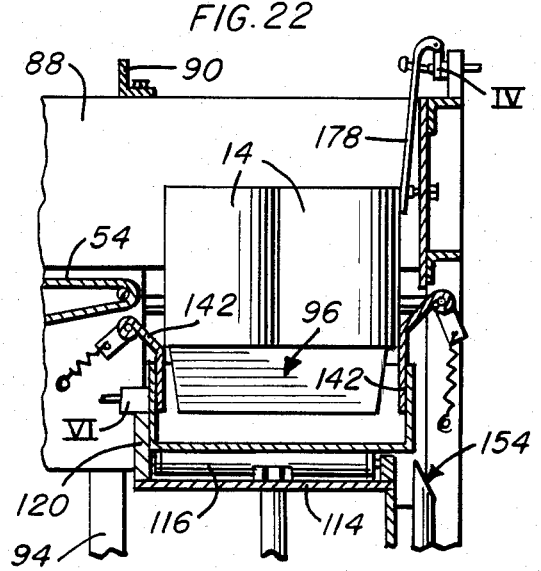
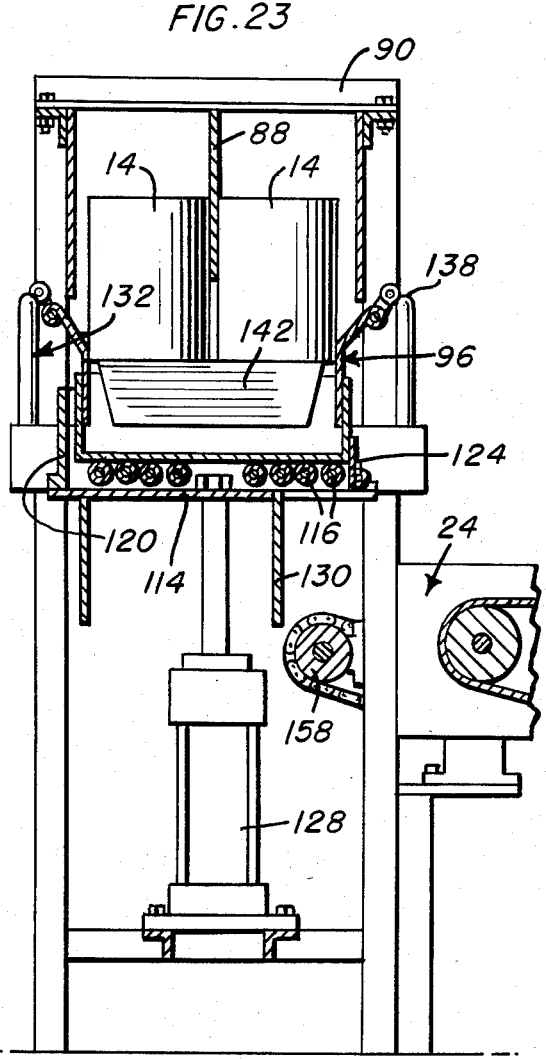
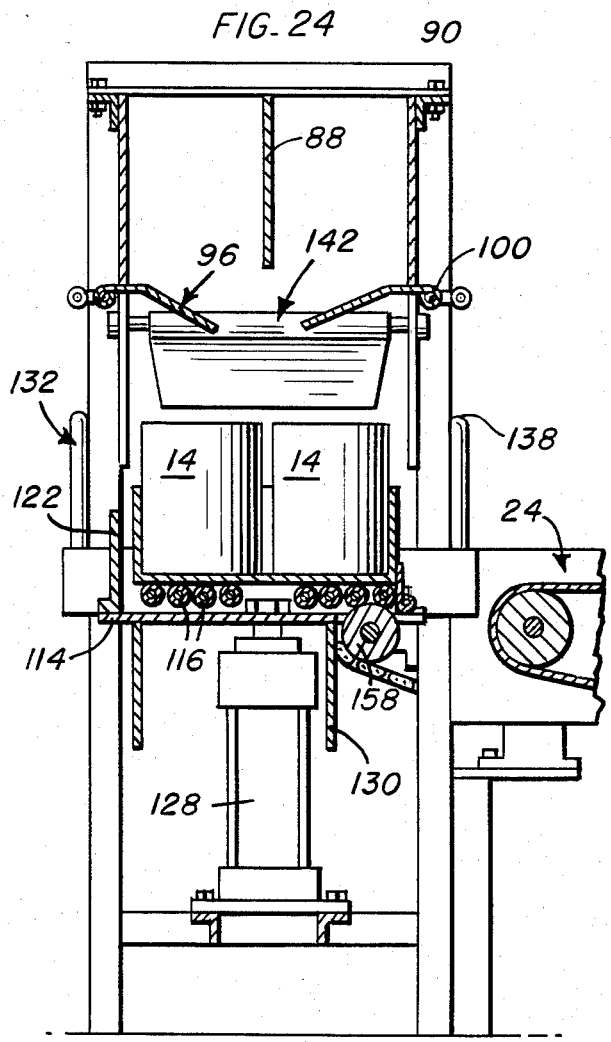

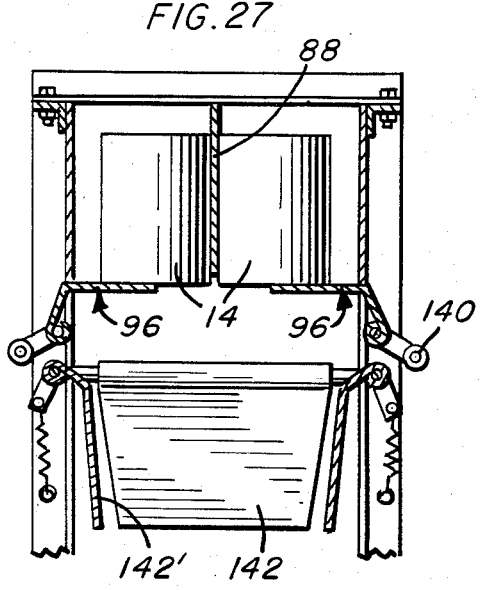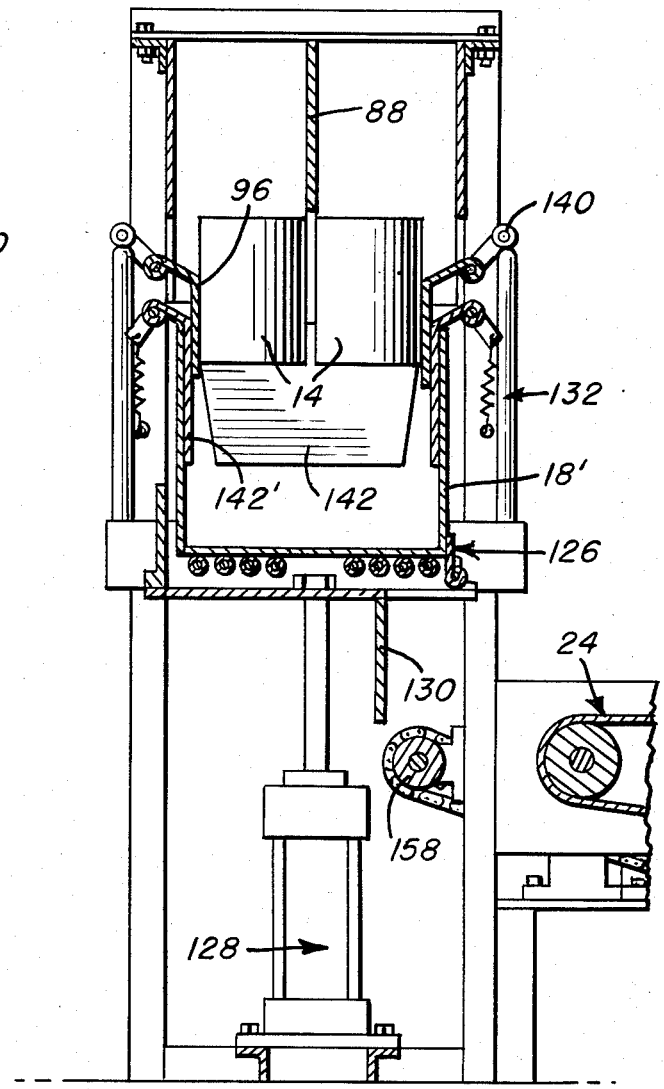

CASE PACKER

BACKGROUND OF THE INVENTION

The invention herein is concerned with a system for packing cans or the like, for example cans of paint, into a case or carton automatically and as a sequence in conjunction with related container handling procedures including filling, labeling, bailing, and the like. Many examples of apparatus developed for the automatic depositing of multiple products within a case are known. However, known systems normally require complex apparatus and a handling sequence which is cumbersome and in most instances incapable of operating at a speed sufficient to accommodate the output of a production line. In other words, unless the containers or articles can be cased as fast as they are discharged from a production line, for example a paint can filling, labeling and bailing operation, the casing system will cause bottleneck and a corresponding reduction in output.

SUMMARY OF THE INVENTION

The packing system of the present invention is uniquely adapted for high speed continuous operation utilizing a system of controls interrelated with the respective movement of the product and the receiving case therefor in a manner which ensures a continuing safe and trouble-free flow. A fluidic control system is proposed wherein the position of the products to be cased, as well as the case or carton itself, is sensed at each of the significant stations of or positions along the flow lines of the apparatus.

Basically, the products are introduced along an accumulator conveyor, the downstream end of which is provided with a low divider rail for sequentially positioning the products to first load in one lane and then in a second lane. The low height of the rail is significant in that there is an avoidance of any bails or ears as are frequently on gallon paint cans and the like. The grouped cans or products are moved, subsequent to the grouping, as a unit along an infeed belt which, through high surface friction, provides for a positive engagement of the grouped products and a direct introduction thereof onto horizontally oriented pivotally mounted panels. The proper positioning of the group of products on the panels is sensed by a pair of switches in series. Underlying the product supporting panels is a vertically adjustable table which receives an empty carton, the carton signaling its presence below the panels. Upon an alignment of the group of products and underlying carton, the carton is elevated causing, through a camming system, a downward pivoting of the support panels and a lowering of the group of products into the ascending carton. The loaded carton is then vertically retracted and, through roller drive means, is laterally discharged onto and along a discharge conveyor. The discharging loaded carton triggers a further switch which allows a further cycling.

BRIEF DESCRIPTION OF FIGURES

FIG. 21 is a transverse cross-sectional view taken substantially on a plane passing along line 21—21 in FIG. 16;

FIG. 22 is a transverse cross-sectional view taken substantially on a plane passing along line 22—22 in FIG. 17;

FIG. 23 is a transverse cross-sectional view taken substantially on a plane passing along line 23—23 in FIG. 17;

FIG. 24 is a transverse cross-sectional view with the grouped cans fully received within a lowered case;

FIG. 27 is a transverse cross-sectional view similar to FIG. 21 and illustrating a loading chamber modified to accommodate both trays or cartons without flap closures and cartons with flap closures;

FIG. 28 is a view of the structure of FIG. 27 with the support panels open;

DESCRIPTION OF PREFERRED EMBODIMENT

Figure 1:
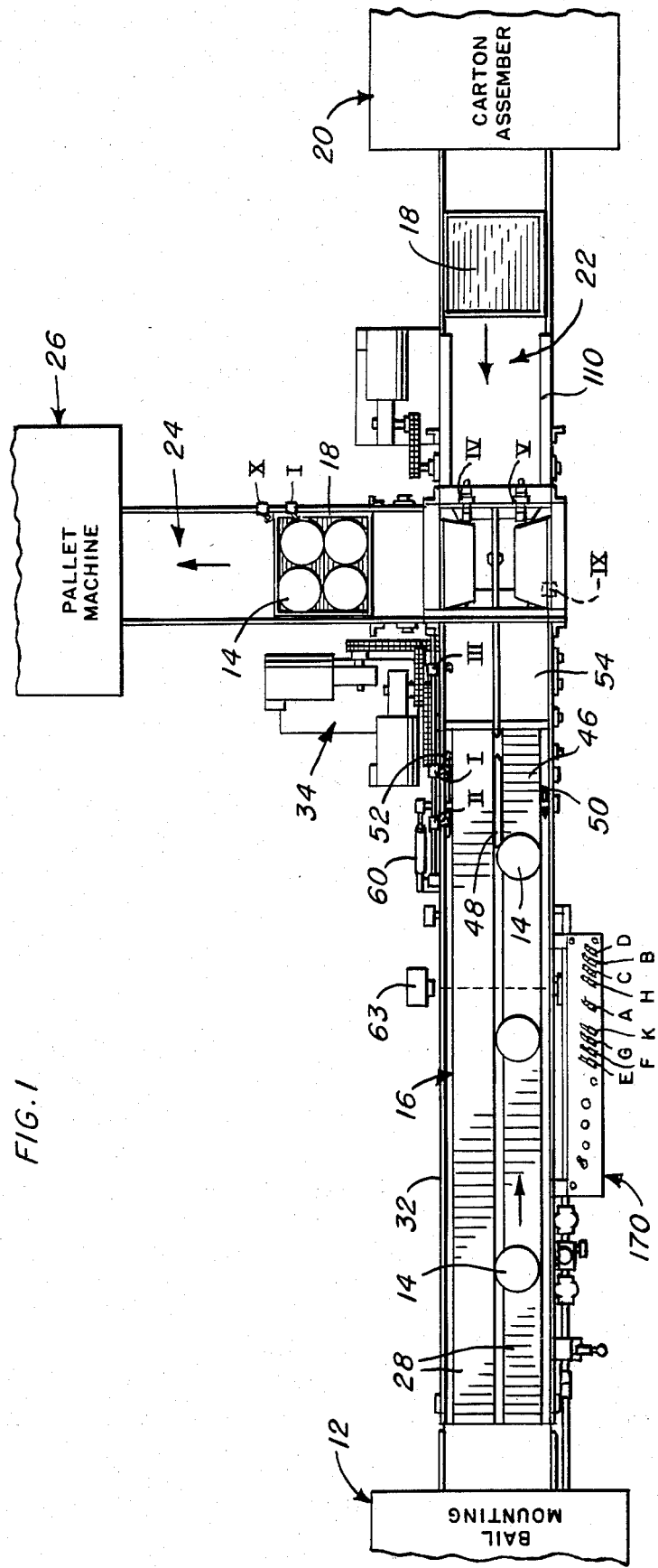
FIG. 1 is a plan lay-out of the case packer of the invention shown in operative position with cooperating apparatus.
Figure 2:
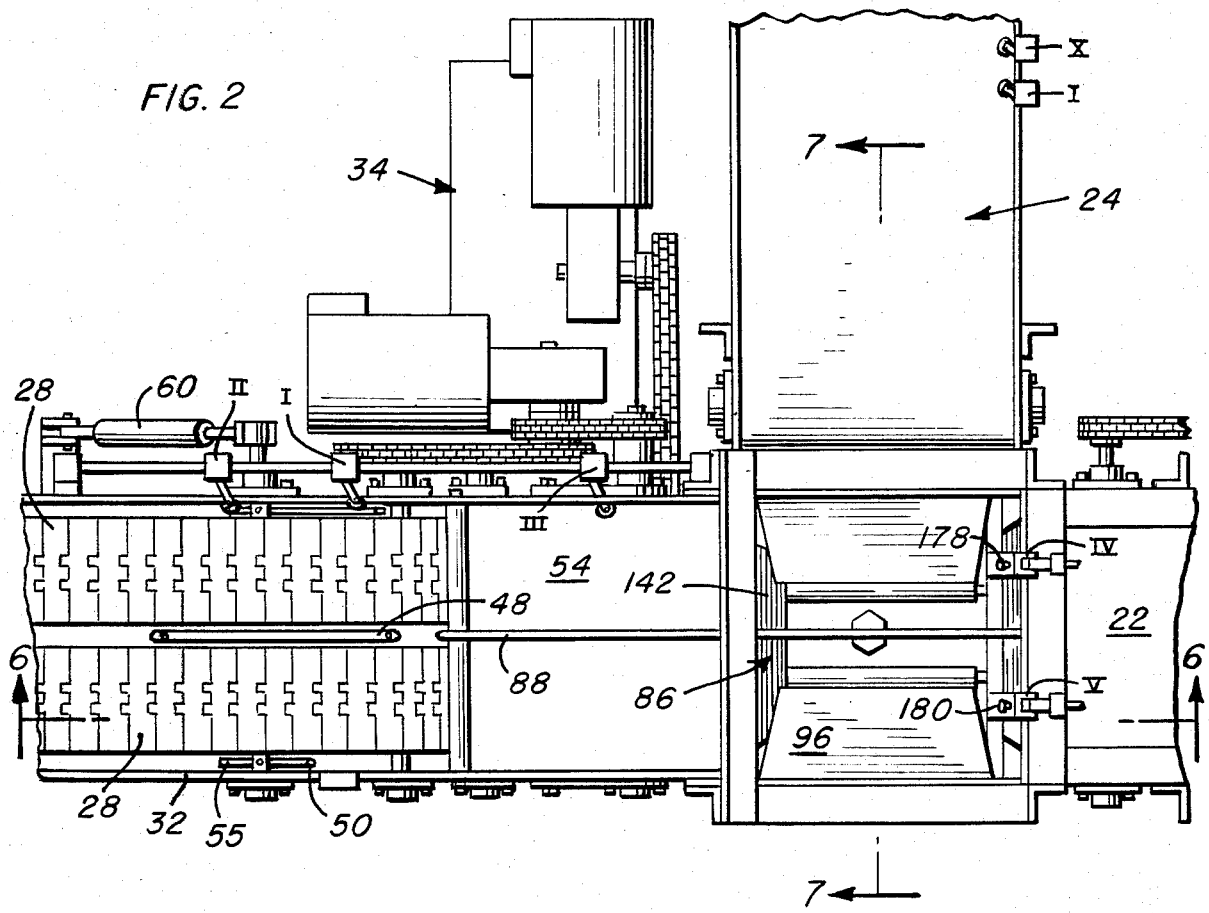
FIG. 2 is a top plan view illustrating the packer at the loading or packing chamber, and adjacent conveyors.

Referring now more specifically to the drawings, the apparatus of the system which comprises the present invention is, in its entirety, designated by reference numeral 10. This apparatus 10 will normally be associated with a continuously feeding source of cans, or like goods, which are to be grouped and packed. Such a source can be, as contemplated in the specific environment wherein the invention was developed, a paint can filling and capping assembly system, frequently terminating, as the last station therealong, in bail forming and mounting equipment 12. The apparatus 10 is adapted for or positioned to directly receive the bailed products or cans 14 on an accumulator 16 aligned with the discharge end of the supply line, normally immediately beyond the can bailing equipment 12.

A continuing supply of trays or cartons 18 for receiving accumulated groups of cans 14 or the like is provided. These cartons may be introduced directly from carton assembly equipment 20 which discharges directly onto a carton introducing conveyor 22. The conveyor 22, as a portion of the assembly 10, introduces the cartons, synchronized with the flow of cans, for a loading of a predetermined number of cans in each carton.

The assembly apparatus 10 also includes a discharge motor-driven conveyor 24 which outwardly directs and discharges the loaded cartons, normally to some appropriate automatic handling equipment, for example a pallet loading machine 26.

The accumulator 16 comprises an elongated conveyor defined by a pair of elongated belts 28 engaged about end rollers 30. The rollers 30 are rotatably mounted between opposed side panels 32 located immediately outward of the conveyor defining belts 28. The roller 30 at the downstream end of the belts 28 is the drive roller, chain driven, through appropriate reduction gearing, by a power source 34 immediately to one side of the accumulator and positioned for a driving of all of the conveying components of the assembly.

The belts 28 are formed of pivotally interconnected or linked plates provided with inwardly directed lugs 36 which cooperate with lugs 38 on the driven roller 30 whereby a positive drive relationship is obtained. Noting FIG. 6 in particular, both the upper and lower runs of the belts 28 travel on underlying support tables 40 and 42 which are mounted between the opposed side panels 32 and include underlying support members 44.

As will be appreciated, the intake end of the accumulator 16 is positioned immediately adjacent the discharge of the supply source of cans, for example bail mounting equipment 12, for the discharge of the loaded cans onto the belts 28. The synchronized movement of the belts 28 carry the introduced cans 14 downstream to a grouping area 46 wherein the cans 14 are arranged in two equal lanes or rows of cans, normally two cans 14 in each row. The grouping area 46, immediately adjacent the discharge end of the accumulator 16, is divided into the two lanes by a longitudinally extending divider rail 48 mounted between the belts 28 and projecting to a height sufficient to effect a positive engagement of a belt moved can 14 thereagainst. The can 14, primarily based on its original orientation on the belts 28, will, upon engagement with the divider rail 48, be cammed or directed to one side of the rail 48. Inasmuch as the cans may include bails and bail mounting ears, the divider rail will project above the upper surface of the belts 28 a distance only sufficient to insure a proper engagement with the lower or rimmed portion of a can for a lateral directing thereof without interference with or from the bail or bail mounting ears.

For purposes of explanation, and noting FIGS. 1, 12, 13 and 14, the lowermost belt 28 will be deemed the near belt, with the upper belt being deemed the far belt. It is significant that the initial orientation of the cans 14 on the accumulator 16, off center relative to the belts 28, be such whereby engagement of the cans 14 with the divider rail 48 will inherently rotate all cans 14 coming in contact therewith to one side thereof within the grouping area 46. This initial orientation can also be utilized to specifically position the bails either inwardly directed or outwardly directed within the carton. As illustrated, the initial cans 14 rotate to the right and onto the near conveyor 28 with the initial cans 14 being retained within the grouping area 46 against discharge by a first vertically extending stop lug 50 located immediately outward of the near belt 28 and in the path of travel of the leading can. The stop lug 50 precludes movement of the other cans stacked thereagainst, the belt 28 having a rather smooth upper surface sliding freely under the retained cans. It will be appreciated that the stop 50 is located to position the second or last of the associated stacked cans to extend beyond the upstream end of the divider rail 48 by a distance equal to approximately half the diameter of the can. In this manner, the last stacked can on the near belt 28, and in the near lane, itself acts as a camming surface for following cans. Noting FIGS. 12, 13 and 14 in particular, it will be recognized that the orientation of the incoming cans is such whereby the first lane is completely filled, in this case by two cans, after which the incoming cans are directed into and fill the second lane. Thus, the exact number of cans is accumulated in a specific order. In this manner the signalling of a full or complete group can be easily effected, utilizing simplified controls and a minimum of sensing devices, for example only one or tw switch means as shall be explained subsequently. Any following cans will alternately accumulate in two rows upstream of the two divider formed lanes, with an equal number of cans in each row for movement into the grouping area 46. This is significant, when viewed in light of known random accumulating systems, in avoiding erratic accumulating and erratic operation normally resulting therefrom. The accumulation in specific predetermined groupings also enables use of an accumulator system of substantially reduced length, thereby reducing space requirements and increasing the speed and efficiency of the operation without complex mechanical means. The row of cans in the second lane is retained by a separate stop lug 52 oriented downwstream of the first stop lug 50 by a distance equal to approximately one half the diameter of the cans. Upon the grouping of an equal number of cans in each of the lanes or stacks within the grouping area 46, the stops 50 and 52 are released and the cans, through the continuously moving belts 28 of the accumulator 16, move onto an infeed belt 54. It will be recognized that the one-half diameter can offset will allow the accumulating cans to continue to align in two equal rows, even should there be a delay in releasing the formed group. Similarly, the same basic stacking can be used to form groups of three or more rows. In each case, the sequential loading of the lanes is effected without requiring complex means to sense and/or sort the incoming cans.

The stop lugs 50 and 52 comprise the upturned ends of a pair of elongated rods, 55 and 56 respectively, which project upstream of the accumulator 16 beneath the upper runs of the belts 28 and into engagement with a transverse rotatably mounted shaft 58. Rotation of this shaft effects a simultaneous upward projection of the stop lugs 50 and 52 into the can retaining position, or a downward retraction of the stop lugs to allow for a free discharge of the grouped cans. This rotation of the shaft 58 is effected by a double acting power cylinder or fluid motor 60 engaged between a link 62 rigidly affixed to one projecting end of the shaft 58, and a mounting bracket 64 rigid with a structural component of the accumulator 16, for example one of the side panels 32. The link 62 and position of the fluid motor 60 is such whereby a rotation of the shaft 58 and a selective raising or lowering of the stop lugs 50 and 52 is achieved in response to a selective extension and retraction of the fluid motor 60.

Figure 10:
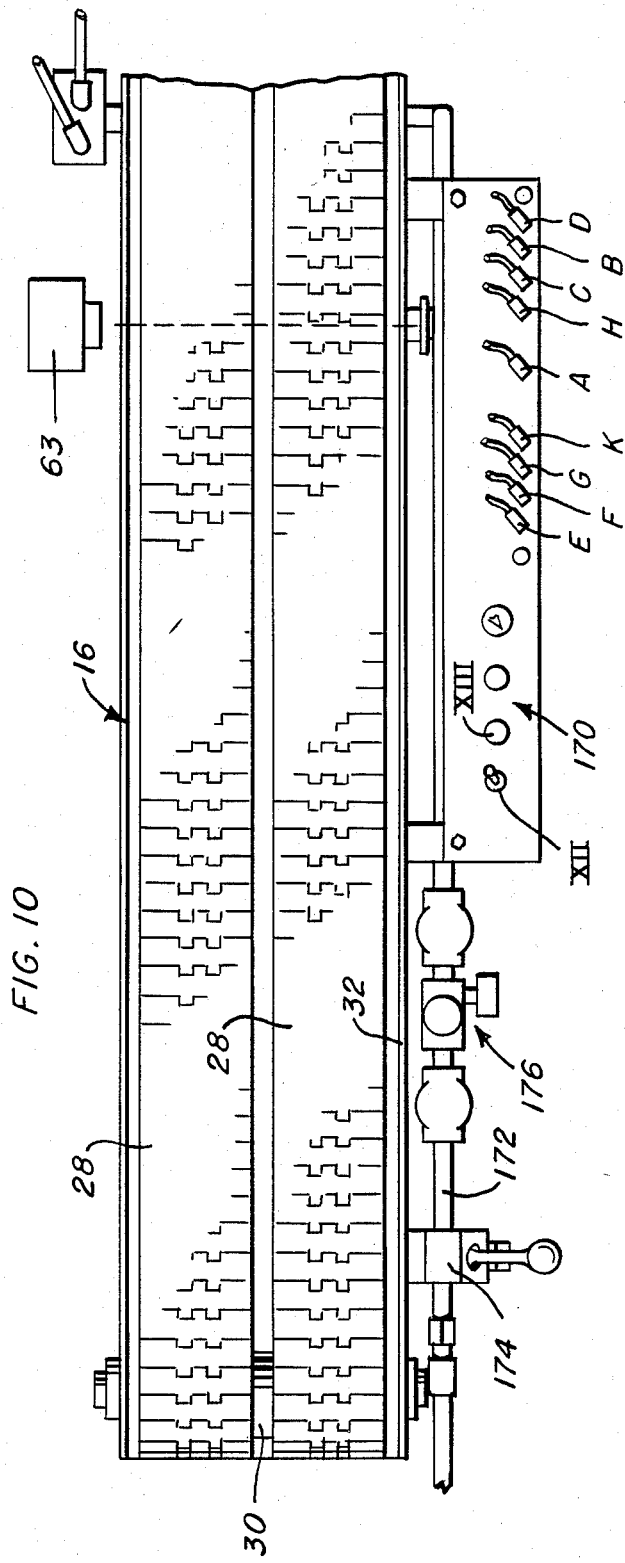
FIG. 10 is a plan view of a portion of the packer assembly to the left of that illustrated in FIG. 2 and showing the control center for the incoming pressurized fluid.
Figure 11:
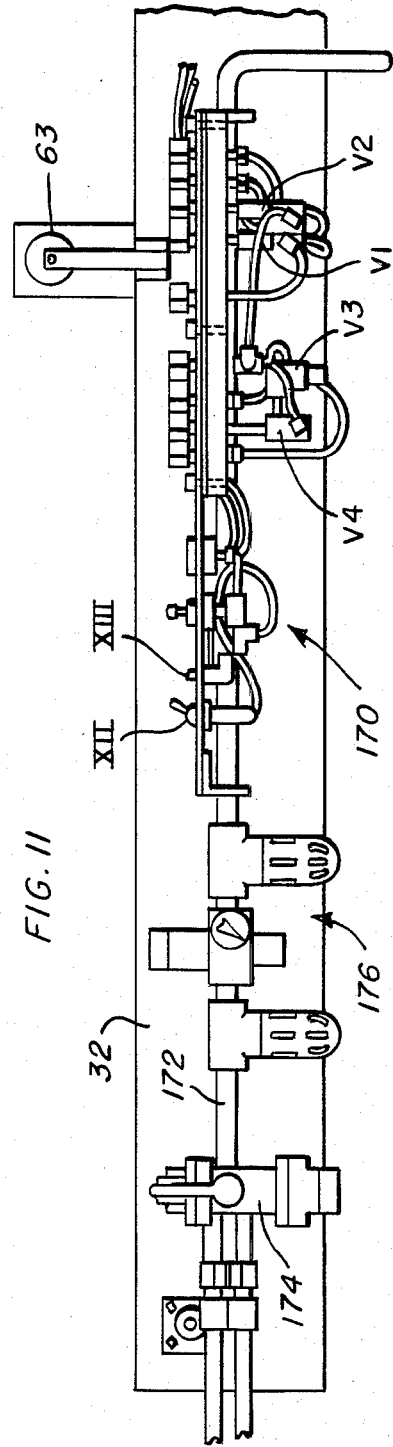
FIG. 11 is an elevational view of the control center.
Figure 12:
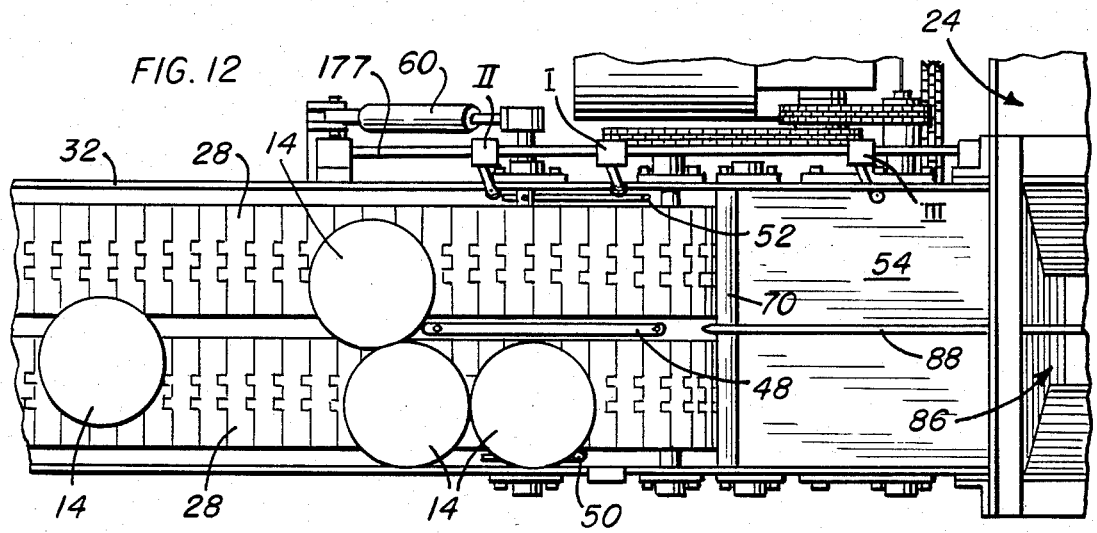
FIGS. 12, 13 and 14 sequentially illustrate the grouping of the cans by the accumulator.
Figure 13:
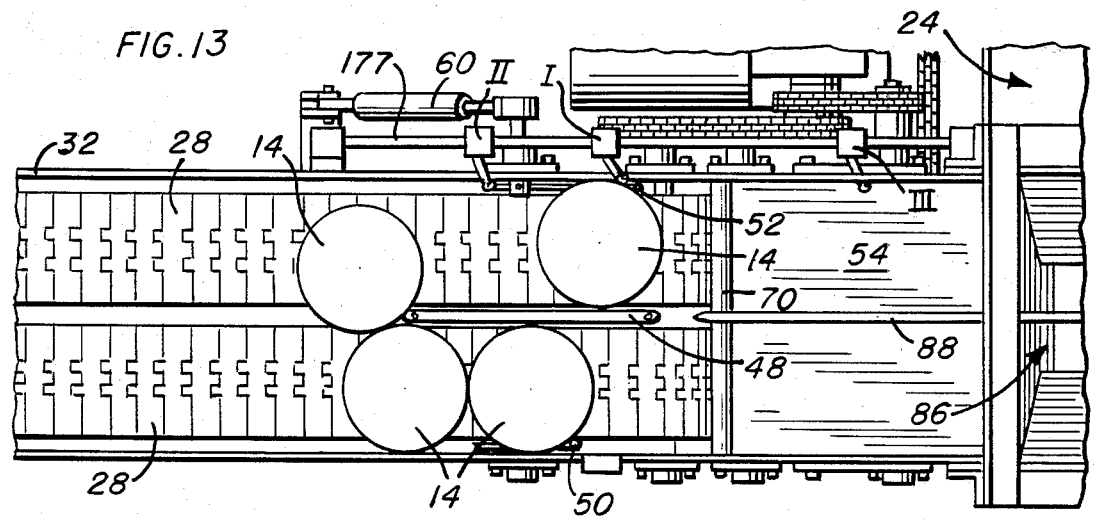
Figure 14:
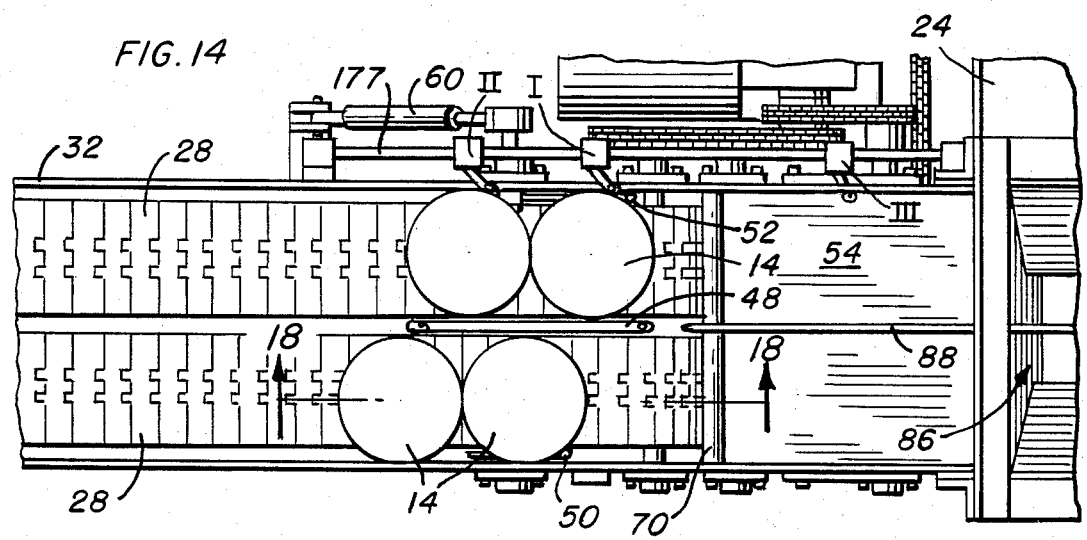
Figure 15:
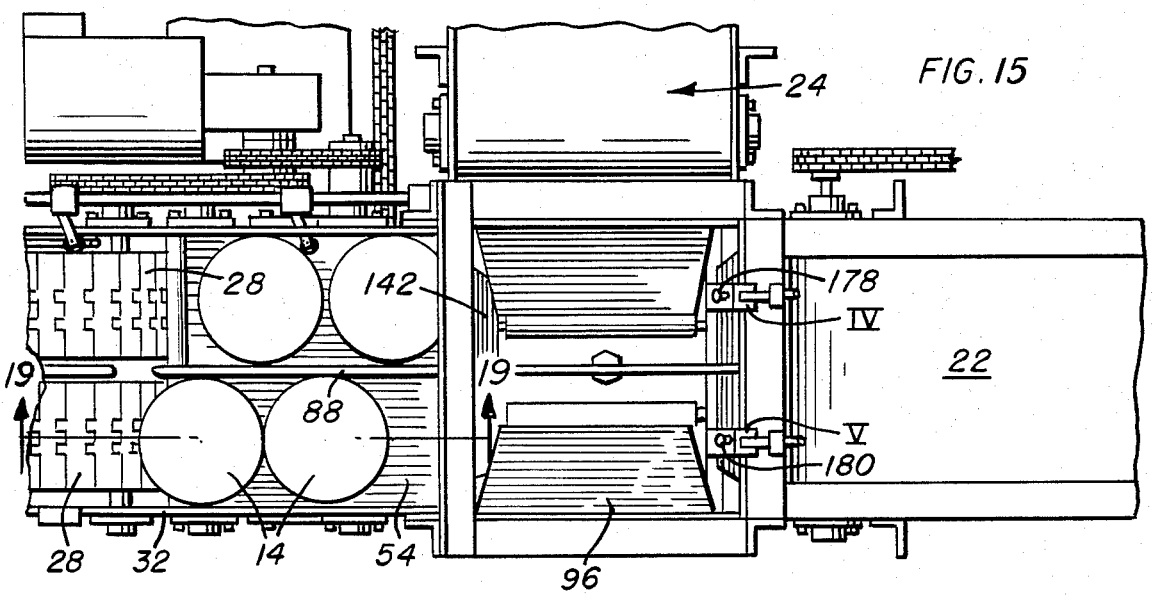
FIG. 15 is a plan view illustrating the grouped cans on the infeed belt.
Figure 16:
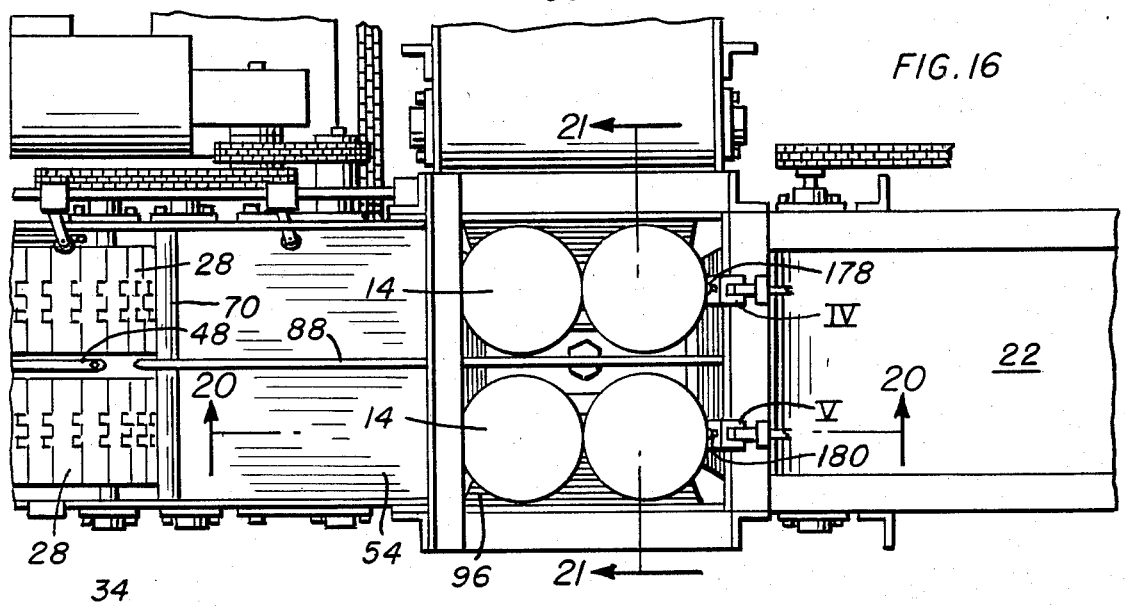
FIG. 16 is a plan view of the grouped cans positioned on the support panels in the packing chamber.
Figure 17:
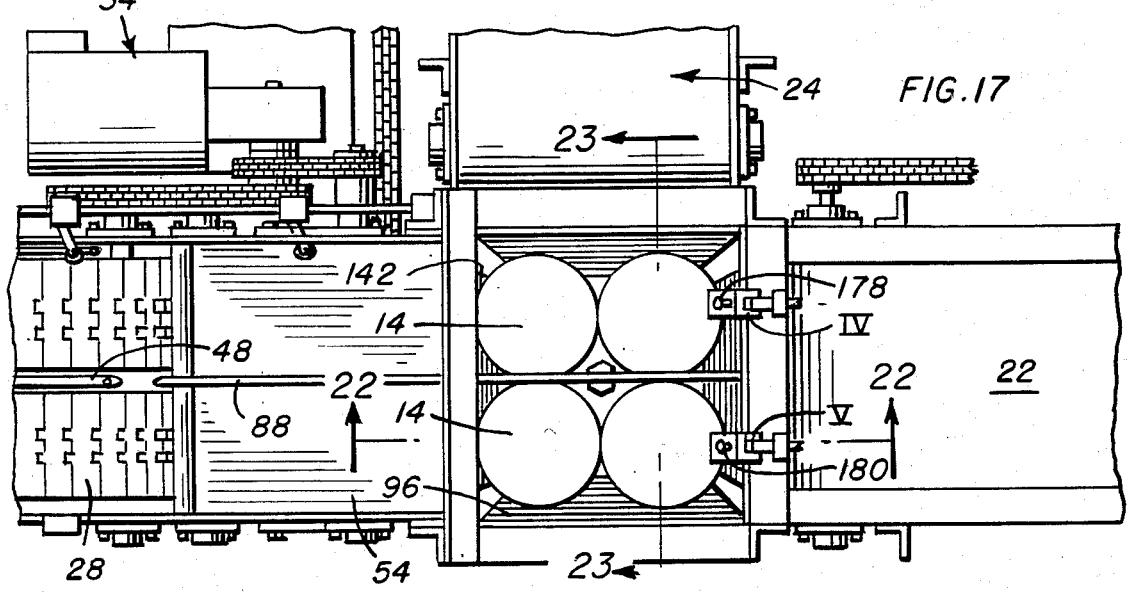
FIG. 17 is a plan view of the grouped cans with the support panels pivoted downward for a downward discharge of the cans.
Figure 18:
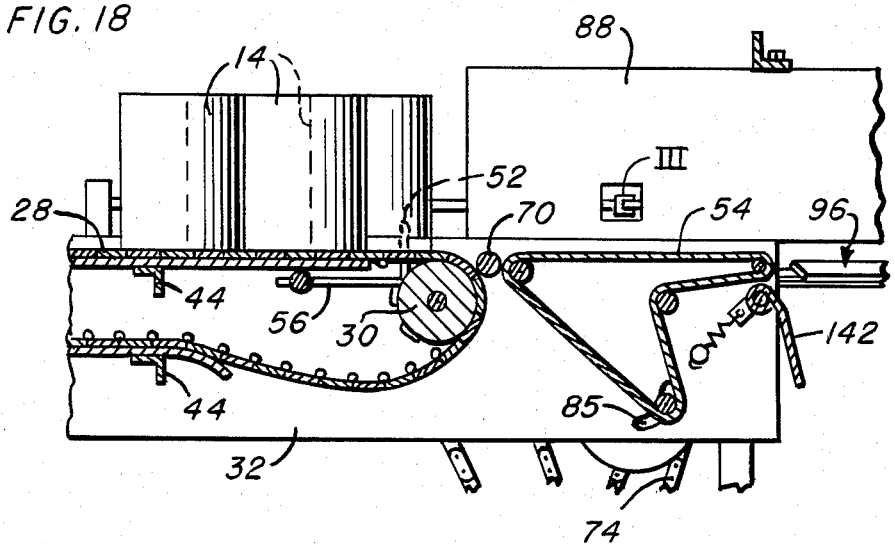
FIG. 18 is a transverse cross-sectional view taken substantially on a plane passing along line 18—18 in FIG. 14.
Figure 19:
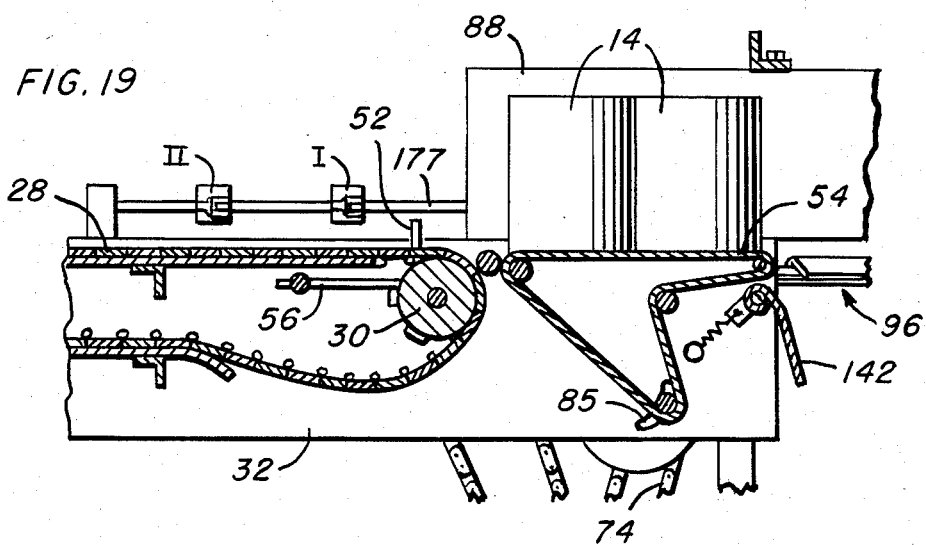
FIG. 19 is a transverse cross-sectional view taken substantially on a plane passing along line 19—19 in FIG. 15.
Figure 20:
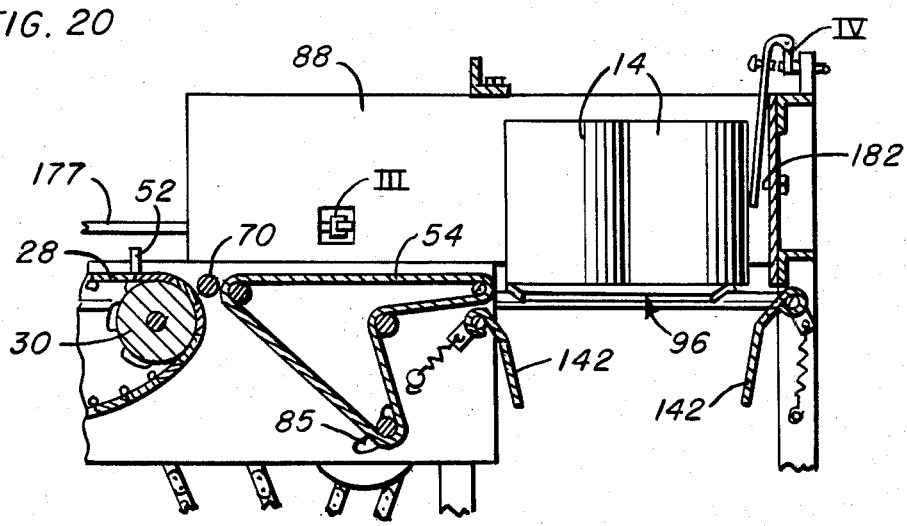
FIG. 20 is a cross-sectional view taken substantially on a plane passing along line 20—20 in FIG. 16.

Noting FIGS. 1 and 10, a photoelectric switch 63 can be provided upstream of the grouping area 46 to sense a buildup of cans 14 sufficient to indicate a possible downstream problem which requires a stopping of the apparatus. Upon a sensing of such a backup, the photoelectric switch will shut off the power unit 34 and bring the entire assembly to a stop until the problem can be rectified and the apparatus reactivated.

The infeed conveyor 54 includes upstream and downstream roller shafts 66 and 68 mounted within appropriate bearing assemblies affixed to the opposed side panels 32 and positioned to define a flat upper run immediately downstream of the upper runs of the accumulator belts 28. A free rotating transition roller 70 may be provided between the discharge ends of the accumulator belts 28 and the loading end of the infeed conveyor belt 54. The infeed belt 54 is engaged about and driven by a roller 72 which is powered from the power unit 34 by means of an endless drive chain 74 engaged about an appropriate drive sprocket on the power unit 34 and a driven sprocket affixed to a projecting end of the shaft of roller 72. One or more idlers 76 can be provided to orient the belt 54 within a relatively confined area in a manner whereby provision is made for other components of the overall apparatus. If desired, the idle roller 76 can be mounted for adjustment whereby appropriate tension is maintained on the belt 54. It is also contemplated that the drive roller 72 be adjustably mounted. This is achieved by having the opposed end portions thereof journaled within appropriate bearings 78 fixed to a pair of disks 80 mounted, respectively, immediately outward of the opposed side panels 32. Each of the mounting disks 80 includes an arcuate slot 82 therein remote from the shaft bearing 78, said slot receiving a mounting bolt 84 therethrough threadedly engaging the corresponding side panel 32 for a clamping of the disk 80 thereagainst. Each disk 80 is rotatably mounted to the side panel 32 at the center thereof with the associated shaft bearing 78 and the corresponding slot 82 located to opposite sides of the central disk mount. In this manner, through a loosening of the bolt 84 and a rotational adjustment of the disk 80, variations in the position of the drive shaft 72 can be obtained for varying the tension in the drive chain 74 and/or the belt 54. Upon being appropriately positioned, the corresponding bolt 84 is retightened to lock the disk 80 in position. Note slot 85 in panel 32 which allows shift of 72.

In order to provide for a positive moving of the grouped cans from the grouping area of the accumulator 16 into, through and out of the infeed assembly, it is contemplated that the infeed belt 54 move at a rate synchronized with the rate of movement of the accumulator belts 28. In addition, and in order to provide for a positive engagement with the cans both as they are introduced to the upper run of the belt 54, and as they are discharged therefrom, it is contemplated that the belt 54 have a much greater coefficient of friction than the belts 28. In this manner, a positive engagement sufficient to effect a complete discharge of each group of cans into the loading chamber is achieved.

The two lanes of two cans, initially defined by the divider rail 48, are maintained, over the infeed belt 54 and into the loading chamber 86, by an elongated vertical divider plate 88 in coplanar alignment with the divider rail 48 and rigidly affixed, as by welding, and depending from a transversly overlying support angle 90. The plate 88 will preferably extend the full height of the divided cans 14 and will be slightly upwardly spaced from the underlying infeed belt 54 to avoid interference with movement of the belt. The leading edge of the plate 88 will function as a means to insure a proper orientation of any can bails or the like in the second row, rotating the can to position the projection inboard within the second row. A similar can positioning means for the first row can comprise a vertical post 89 mounted on the near side panel 32 and defining an abutment in the path of any protruding ear or bail to rotate the can and move the projection inboard of the first row.

The loading or packing chamber 86 is defined within an open structural framework 92 comprising multiple uprights or columns 94 and appropriate transverse stabilizers or bars rigidifying the construction of the framework 92 and, in specific instances, mounting the various components of the loading chamber.

In general alignment with, or slightly below, the plane of the upper run of the belt 54, beyond the discharge end thereof and within the loading chamber 86, is a pair of support panels or flaps 96. These flaps 96 each include an outer full length curled edge which defines a sleeve 98 rotatably received about a shaft 100. Each shaft 100 parallels one of the opposed side edges of the infeed belt 54. The shafts 100 also parallel each other to the opposite sides of the support framework 92 and extend between side upright members 94.

The flaps 96 are normally maintained in a generally horizontal position with the free inner edges thereof separated along the longitudinal center line of the loading chamber 86. Noting the sequential illustrations of FIGS. 21-24, the flaps 96, in the horizontal position thereof, incline slightly downward and inward toward each other to more properly conform to the interior of a tray or carton as the cans settle into the carton. In addition, the supported cans 14 tend to move laterally toward each other against the divider plate 88 and slide freely downward into a loaded position as the flaps 96 are released, all to be explained in more detail subsequently. The full height divider plate or panel 88 is significant as it maintains a complete segregation of the two rows as the cans slide downward. Thus, interference between the bails and/or cans is avoided.

Each of the flaps or panels 96 is maintained horizontal by appropriate spring means, for example a tension spring 102 engaged between an outwardly directed ear 104 welded to the flap sleeve 98 and a spring anchor 106 fixed to the framework 92 or other rigid component of the overall assembly whereby the flaps 96 are biased into a stable horizontal can supporting position until physically rotated for a downward discharge of the cans. The tension of the springs can be adjusted by varying the anchor point of the end thereof. It is to be appreciated that the strength of the springs 102 is such as to provide for a support of the fully loaded cans 14 as they are introduced into the loading chamber 86 and until such time as the cans are to be discharged. The high coefficient of friction provided by the surface of the infeed belt 54 provides for a positive continued movement of the four cans along the upper supporting surfaces of the flaps 96 until fully loaded.

As the cans are being introduced onto the flaps or panels 96, a carton or case 18, which is to ultimately receive the cans, is being introduced into the loading chamber in underlying spaced relation to the flap supported cans 14 by means of an elongated conveyor 22. This conveyor 22 will normally directly receive the cartons 18 from an appropriate automatic carton assembler 20, the operation of which, in conjunction with the travel of the conveyor 22, is synchronized with the remaining components of the overall assembly. The conveyor 22 is of an endless belt construction including opposed end belt-supporting shafts 108, one of which is driven.

In order to insure a proper positioning of the carton 18, and the introduction thereof to the loading apparatus, appropriate guide rails 110 are provided toward the discharge end of conveyor 22, that is the end at which the carton is discharged into the loading apparatus. Such rails 110 will preferably overlie the opposed longitudinal edges of the carton and define a confining side wall therefor.

As the carton 18 moves into the loading apparatus, it is received on a vertically adjustable table 112 which includes a base panel 114 with a series of coplanar overlying rollers 116 which generally parallel the carton feeding conveyor 22 and define an upper carton receiving surface generally coplanar with the upper run of the conveyor 22 for a direct reception of the carton 18 therefrom. The rollers 116 have the shafts thereof supported, at the end closest to the conveyor 22, by a relatively short wall 118 of a height less than that of the upper surface of the rollers 116 for a passage of the carton 18 thereover. The opposite ends of the shafts of rollers 116 are received within appropriate journals in a relatively higher wall 120 which is of a height sufficient to constitute a stop or limit to the inward movement of the carton 18. The carton is retained on the bed of rollers 116 against lateral movement by a wall or abutment 122 projecting upwardly from the table base 114 along one side edge thereof, and a flap 124 along the opposed edge thereof. The flap 124 is resiliently biased to a vertical position by appropriate spring means 126 for selective folding to a horizontal position upon application of a positive force to enable the discharge of a loaded carton thereover, all as shall be explained in more detail subsequently.

Subsequent to positioning the empty carton 18 on the table 112, the table is vertically elevated by means of a double acting fluid ram or motor 128 having an upper end portion centrally secured to the base panel 114 and a lower end portion mounted to appropriate cross members of the support framework 92. The upper portion of the ram 128 may be partially enclosed by depending panels 130. As the table 112, with the empty carton 18 thereon, is elevated toward the flap supported cans 14, a pair of vertical rods 132 travel upwardly therewith. The rods 132 are mounted within vertical sleeve-like brackets 134 and are vertically adjustable therein by, as an example, set screw means 136. The upper end 138 of each of the two rods 132 defines a cam or camming surface. These camming ends 138 align with a pair of cam follower 140, one rigid with and projecting laterally outward from the shaft receiving sleeve 98 of each panel 96. Engagement of each cam end 138 with the overlying cam followers 140, during the continued upward travel of the table 112, effects a controlled downward pivoting of the can supporting flaps 96 and a gradual downward guiding of the cans 14 into the carton 18 at the uppermost position of the table 112. It will be readily appreciated that the camming force exerted by the upward movement of the table 112 is sufficient to overcome the force of the biasing spring 102 associated with each of the flaps 96. The vertical adjustability of each of the cam forming shafts 132 enables a synchronization of the downward discharge of the cans with the upward movement of the carton to effect a smooth nondamaging discharge of the cans 14 into the carton 18. As noted from FIGS. 22 and 23 in particular, the downwardly pivoting support flaps 96 move into the interior of the upwardly moving carton 18 providing both a stabilizing means for the carton, to the opposite sides thereof, and a guide for directing the cans 14 directly into the interior of the carton 18. While the flaps 96 have been illustrated as having the inner edges aligned with and spaced from each other, the flaps can be of a width sufficient to overlap with the cams adjusted to sequentially downwardly pivot the lower flap and then the upper flap. The provision of such wider flaps would be desirable when using deep cartons or cartons with closure panels.

Upon a retraction of the table 112 and a downward withdrawal of the rods 132, the flaps 96, through the action of springs 102, return to their horizontal supporting position. It is proposed that each flap 96 be provided with a shock absorber or cushioning device 141 for dampening movement in one direction. A preferred device would be a hydraulic dashpot engaged between the spring mounting ear 104 and the framework 92. These devices 141, while not encumbering the opening of the flaps 96, provide for a reduced speed or controlled closing thereof. This in turn results in a substantial reduction in the noise level of the apparatus and less wear on the concerned components.

Additional positioning, stabilizing and guiding means are provided by a pair of opposed limited movement flaps 142 oriented at right angles to the support flaps 96 and downwardly inclined for engagement within the opposed sides of the upwardly moving carton. The flaps 142 engage the carton sides which are at right angles to the two sides associated with the support flaps 96 as they downwardly pivot. The flaps 142, in each instance, include a sleeve 144 defined along the outer edge thereof and rotatably received on a transverse shaft 146 affixed to the framework 92. At a point along each of the formed sleeves 144, preferably adjacent one end thereof, the flap 142 is provided with a rearwardly directed ear 148. In order to maintain each of the flaps 142 in its desired downward and inwardly angled orientation, a biasing spring 150 is engaged between each of the flap ears 148 and a pin or other fixed point 152 on a structural portion of the assembly rearward of the corresponding flap 142. The spring 150, in each instance, resiliently maintains the position of the flap 142 for facilitating passage of the corresponding carton side wall therebehind, while at the same time allowing for a limited outward pivoting of the flaps 142 to allow passage of the cans 14 thereby and into the carton 18. The spring biased nature of the flaps 142 aid in guiding and controlling the downward discharge of the cans 14 into the carton 18. It will also be noted that the flaps 142 can be angled for closer accommodation within a carton as the cans move therein.

At this point attention is directed to FIGS. 27 and 28 wherein a modified form of loading chamber has been presented. These views broadly correspond to the original loading chamber as illustrated in FIGS. 21 and 23. Basically, the modified chamber is specifically intended to facilitate loading of products into both open-topped cartons or trays, such as previously described, and deeper cartons provided with closure flaps. Such a carton has been shown in FIGS. 27 and 28 and designated by reference numeral 18'. In order to accommodate the deeper box 18', the loading chamber has been slightly vertically elongated, the power ram 128 now seating directly at floor level or immediately thereabove, rather than on the elevated cross bar as previously illustrated. The modified form further includes a second pair of opposed limited movement flaps 142' which are mounted below the load supporting flaps 96 on shafts parallel to the shafts supporting the flaps 96. In this manner, provision is made for limited movement downwardly angled flaps for engagement within a carton, 18 or 18', immediately inward of all four sides thereof.

Inasmuch as the vertical movement of the carton supporting table must be such as to accommodate both the low wall trays or cartons 18 and the high wall flapped cartons 18', it has been found to be particularly desirable to provide that the limited movement flaps 142' be of an extended length, relative to the previously described flaps 142, in order that the flaps 142' might still engage into the interior of a low wall carton, hile at the same time completely accommodating to the depth of full height cartons with extended flaps.

The extended flaps 142' are mounted for spring resistant pivotal movement, in the same manner as flaps 142, and are so positioned below the load supporting flaps 96 as to allow for the full pivotal movement of the flaps 96 and the discharge of the products therethrough. If deemed desirable, it should be appreciated that the original limited movement flaps 142, in the modification of FIGS. 27 and 28, can also be of an extended length to similarly facilitate accommodation of both low and high wall cartons.

Figure 3:
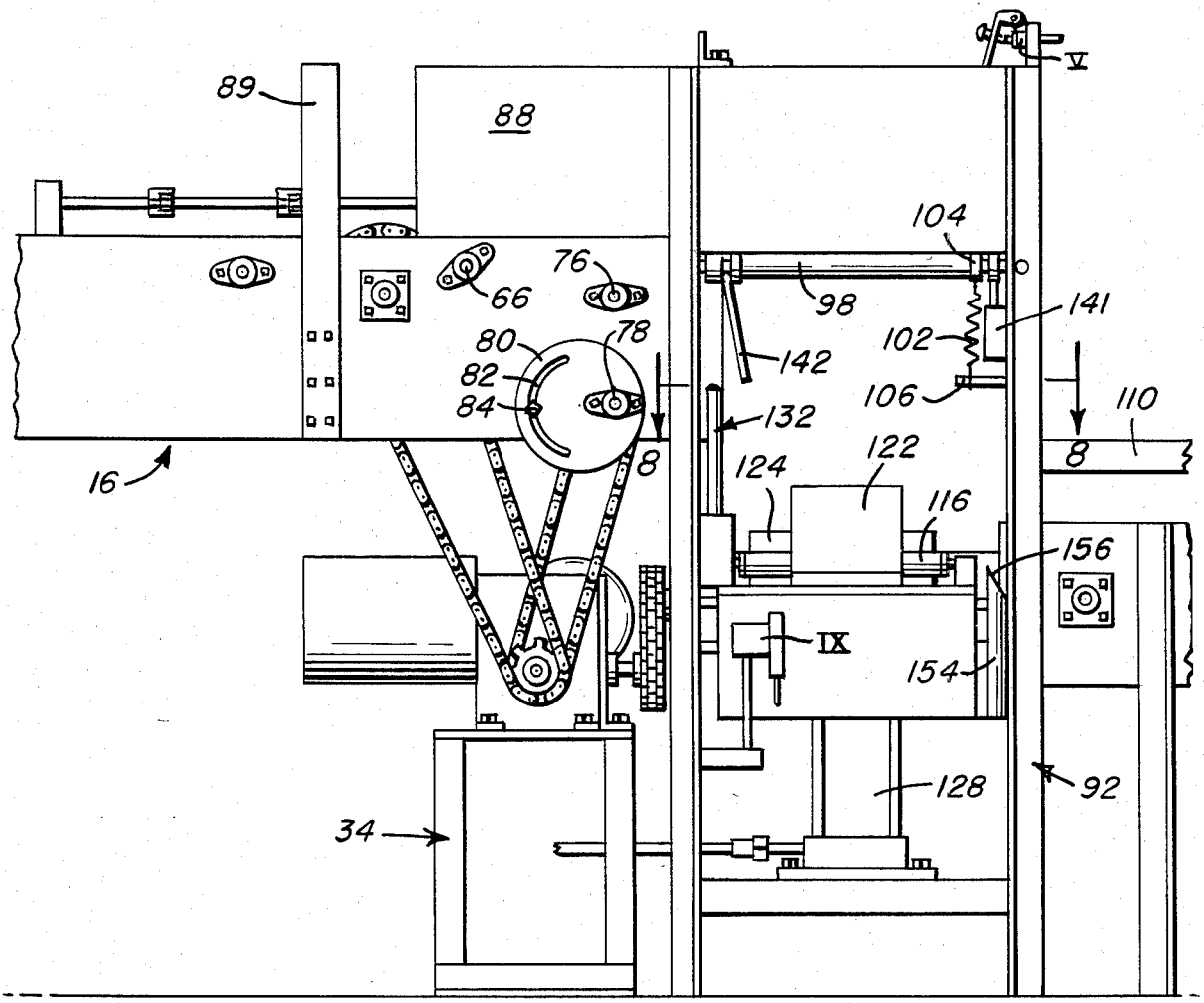
FIG. 3 is a front elevational view of the structure of FIG. 2.
Figure 8:
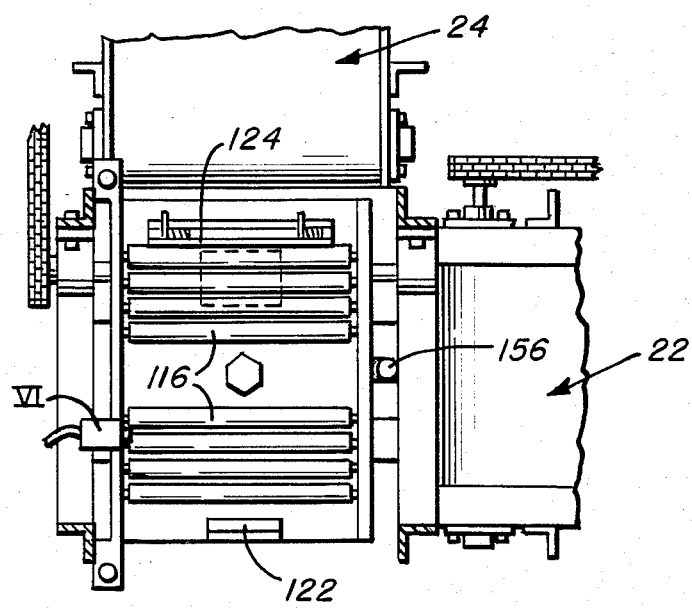
FIG. 8 is a horizontal cross-sectional view taken substantially on a plane passing along line 8—8 in FIG. 3.
Figure 4:
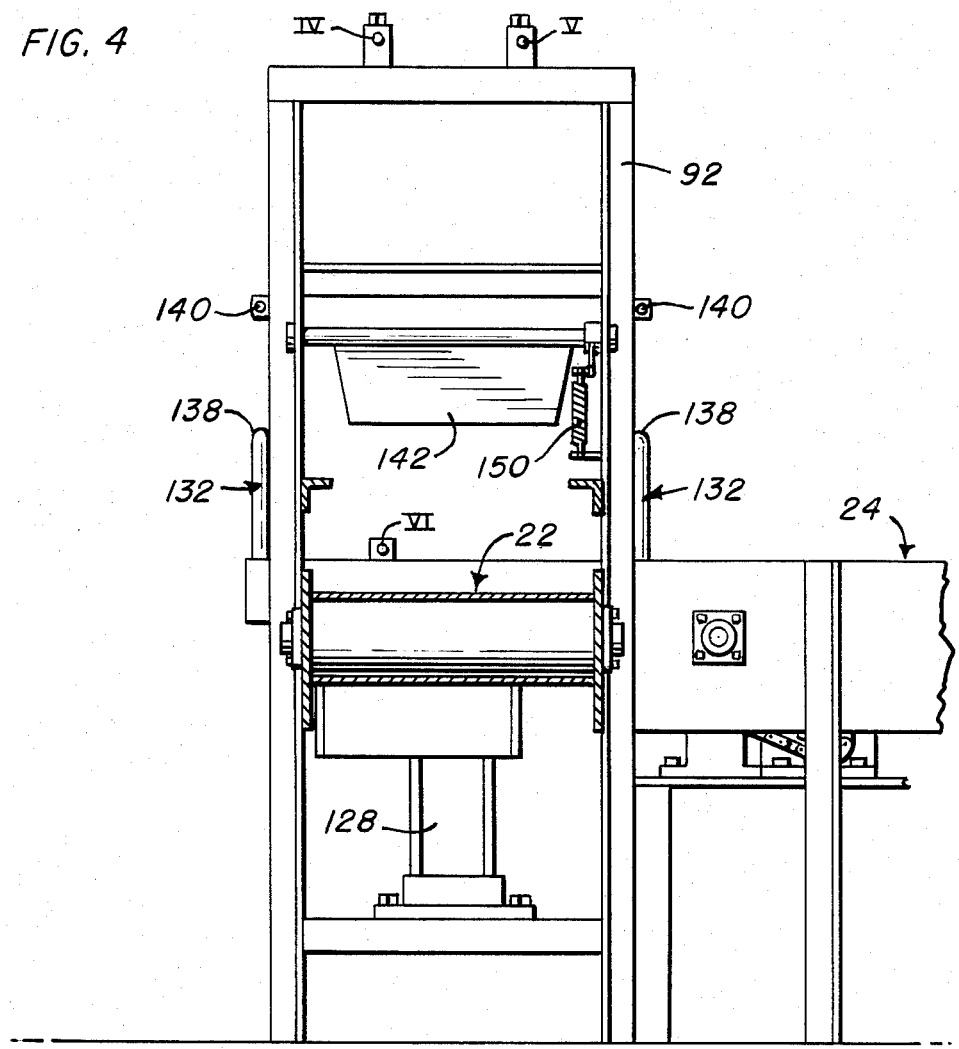
FIG. 4 is a right side elevational view.
Figure 6:
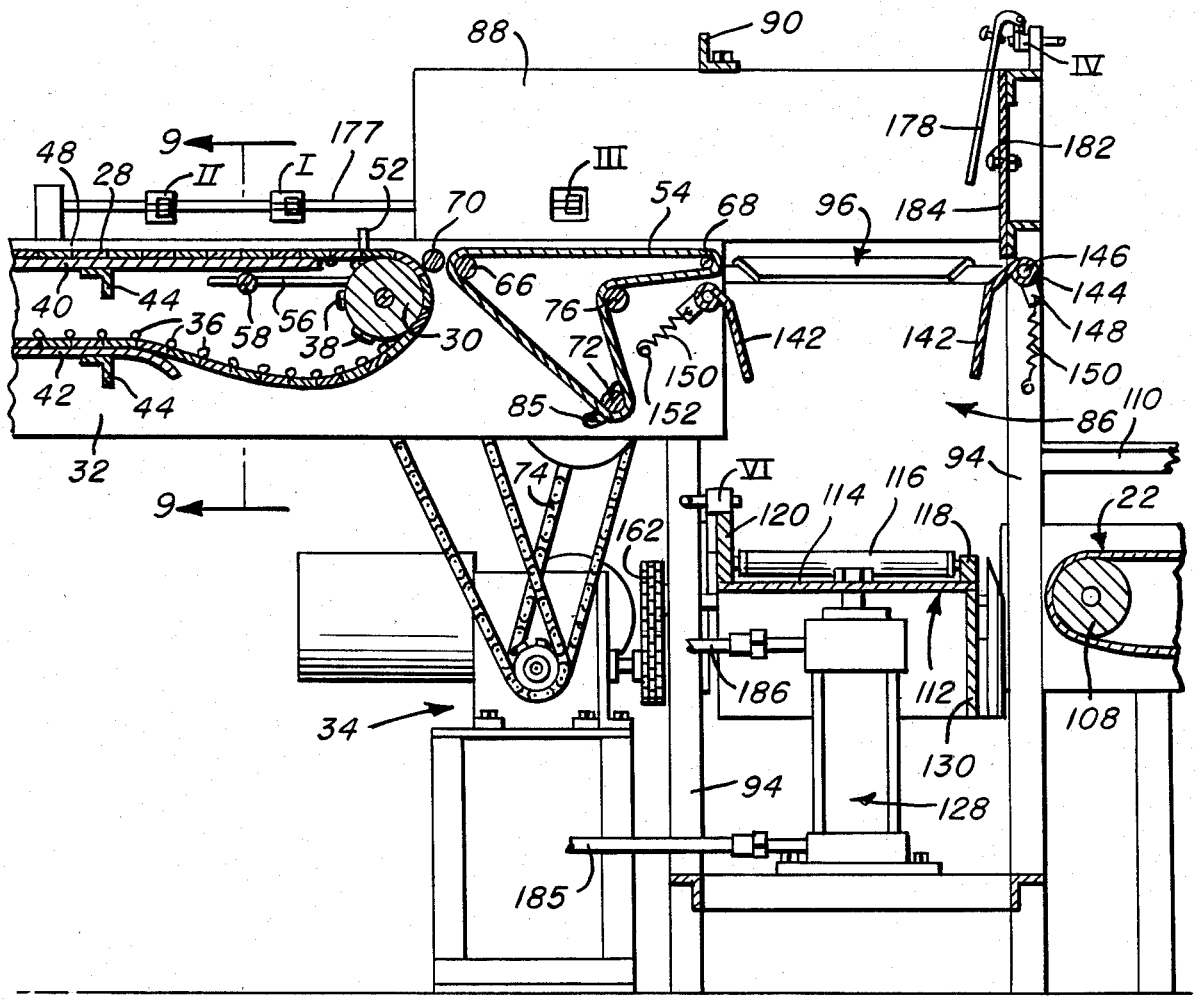
FIG. 6 is a longitudinal cross-sectional view taken substantially on a plane passing along line 6—6 in FIG. 2.
Figure 9:
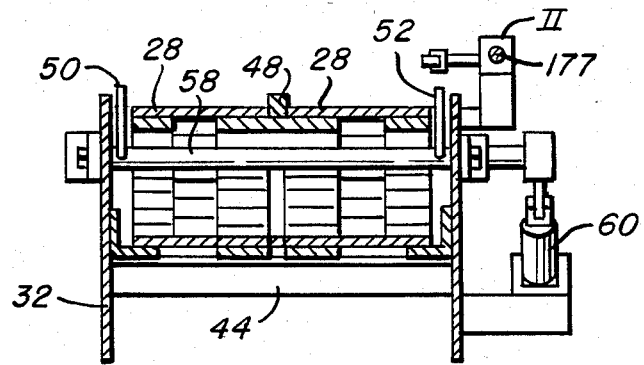
FIG. 9 is a transverse cross-sectional view taken substantially on a plane passing along line 9—9 in FIG. 6.
Figure 7:
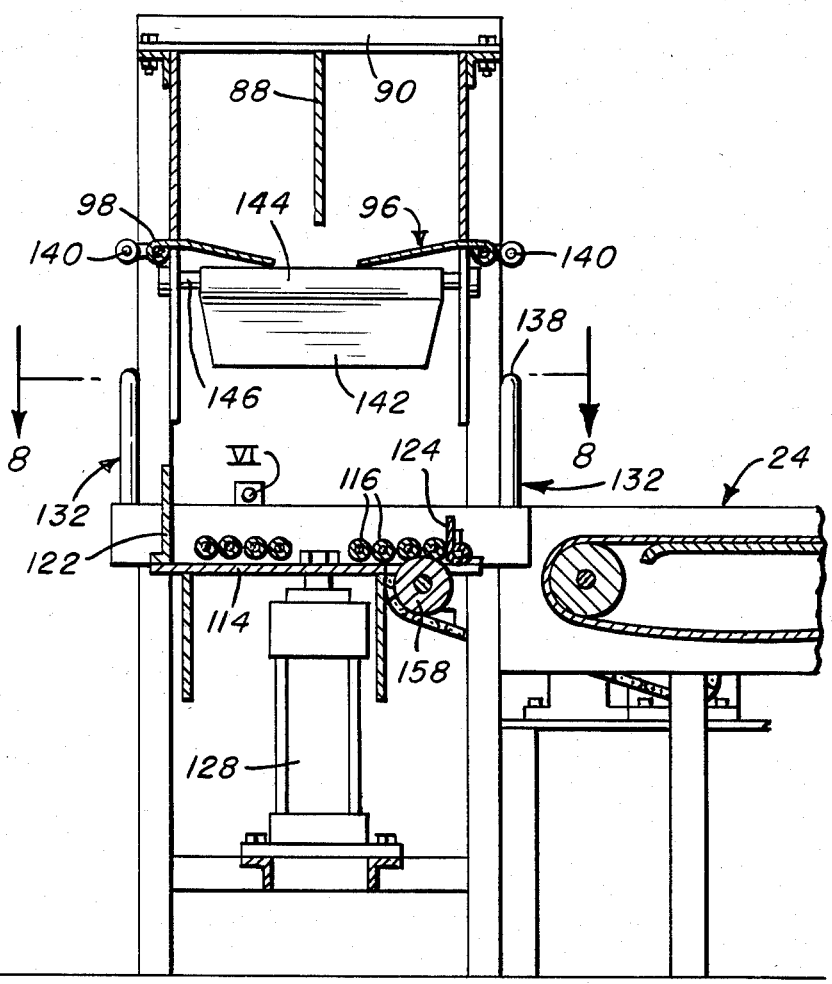
FIG. 7 is a transverse cross-sectional view taken substantially on a plane passing along line 7—7 in FIG. 2.
Figure 25:
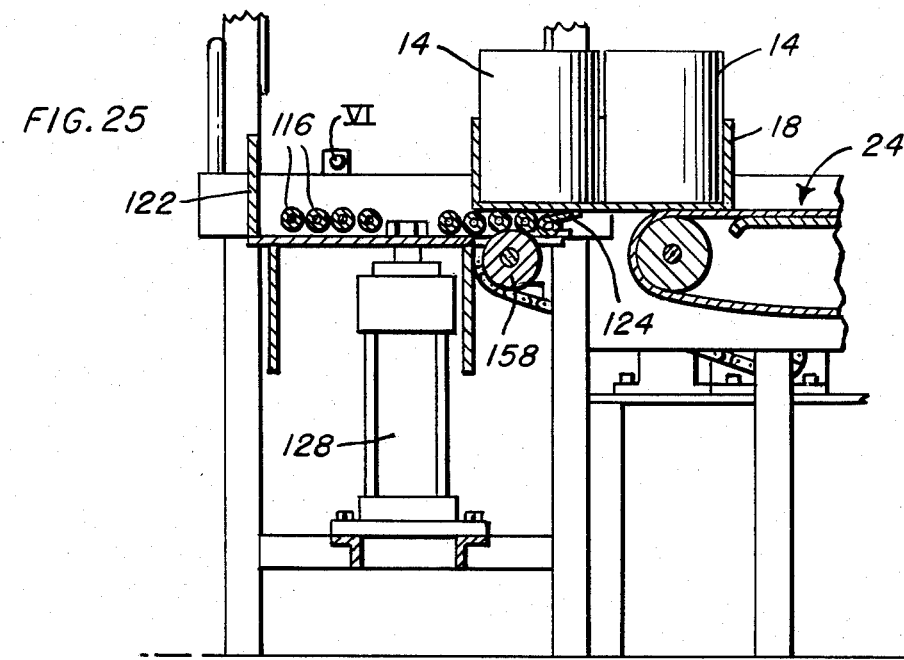
FIG. 25 is a transverse cross-sectional view illustrating the discharge of a loaded case.

Noting FIGS. 3 and 6 in particular, a divider rod 154, having a beveled upper end 156 slightly below the plane of the carton introducing conveyor 22 and the top of the carton support rollers 116, is affixed to the table at approximately the midpoint of the corresponding side thereof facing the carton introducing conveyor 22. When so positioned, the beveled upper end of the divider rod 154 will move between the table received carton and a following carton to retain any such following cartons on the conveyor 22 as the table raises and descends. In this manner, there is no danger of overfeeding of the cartons or interference with movement of the table. In addition, the previously referred to guide rails 110 prevent any tendency for an upward deflection of a carton by the divider rod 154. This, in turn, insures a proper positioning of cartons for movement onto the table. once the filled carton is lowered, the filled carton itself will preclude introduction of a subsequent empty carton until such time as the filled carton is discharged from the loading chamber. The speed of the discharging filled carton is sufficient to avoid any interference therebetween.

Subsequent to an introduction of the cans 14 into the carton 18, the table 112 is lowered, through reverse action of the fluid ram 128. In its lowermost position, note for example FIG. 24, one or more of the support rollers 116 seat in driving engagement with an underlying enlarged drive roller 158 paralleling the rollers 116 adjacent the spring loaded flap 124. The roller 158, mounted in appropriate bearing blocks or journals 160, is chain driven, as at 162, from the power plant 34. Upon engagement of one or more support rollers 116 with the drive roller 158, the driving force of the roller 158 is transferred to the one or more rollers 116 engaged therewith and the loaded carton 118, due to the substantial weight thereof, moved to collapse the spring loaded flap 124 and discharge thereover onto a discharge conveyor 24. Referring to the initial introduction of an empty carton 18 onto the roller defined support, it is to be appreciated that the spring biasing on the flap 124 is sufficient to overcome or effectively resist any tendency for the empty carton 18 to discharge. In other words, due to the relatively light weight of the carton 18 itself, insufficient friction is developed between the driven rollers 116 and the under surface of the carton 18. However, when the carton is fully loaded, the weight of the cans 14 therein result in a substantial frictional interface between the bottom of the carton and the driven rollers 116 sufficient to provide the desired movement of the filled carton 18, the collapsing of the flap 124 in response thereto, and the complete discharge of the loaded carton onto the discharge conveyor 24. It should be appreciated that the spring loaded flaps 124, in a structurally simple manner, presents a highly unique means for selectively retaining the empty cartons and providing for the discharge of the loaded cartons. This is done without the necessity of relying on complex controls, sensing devices electrical or fluid motors, or the like. Thus, all of the problems attendant to the use of sophisticated controls are avoided. The conveyor 24, normally an endless belt engaged about end rollers, moves the loaded cartons 18 to a final handling or storage area which, as illustrated, may be an automatic pallet loading apparatus 26.

Figure 26:
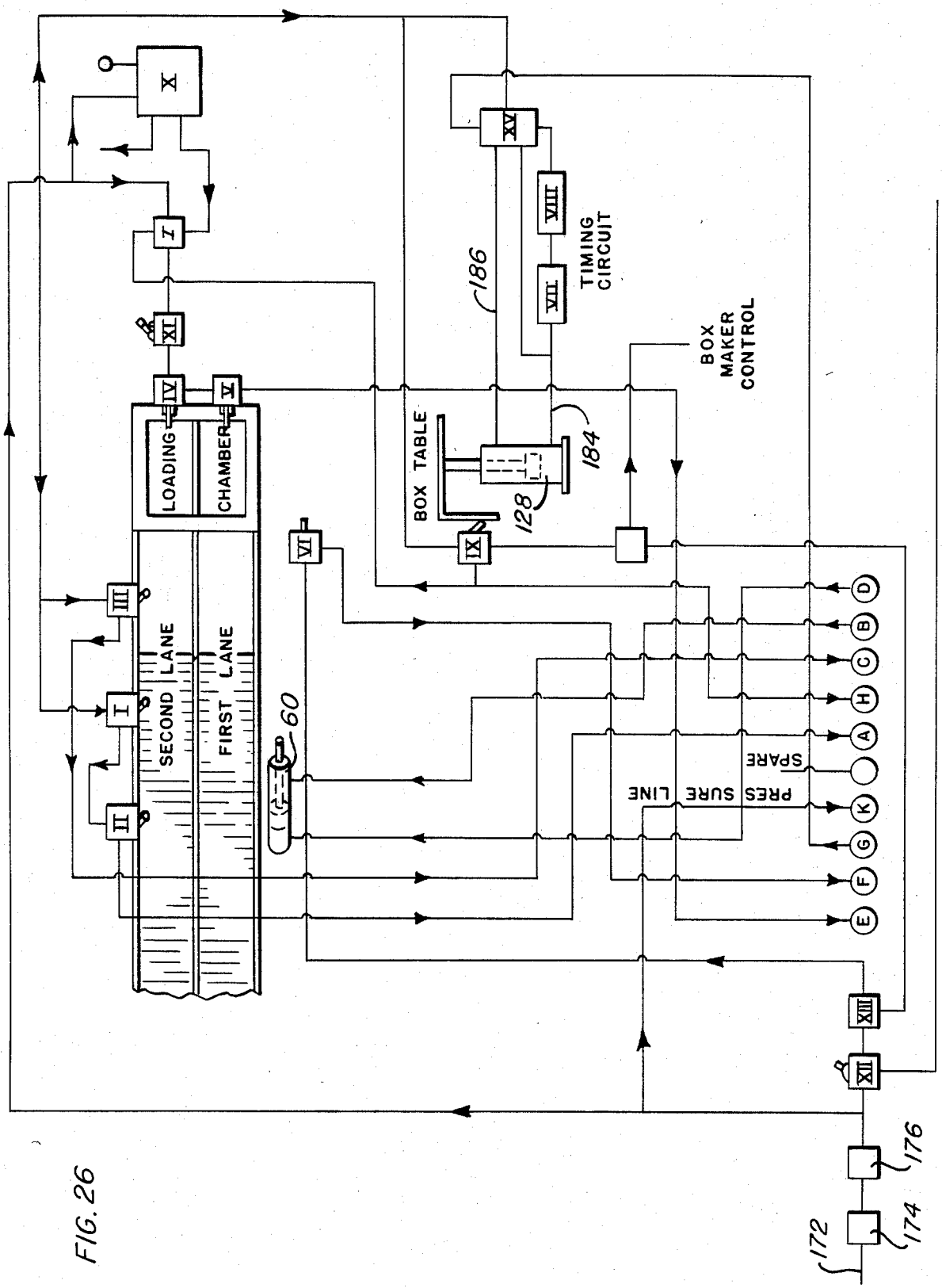
FIG. 26 is a schematic illustration of the control system for the apparatus of the invention.
Figure 29:
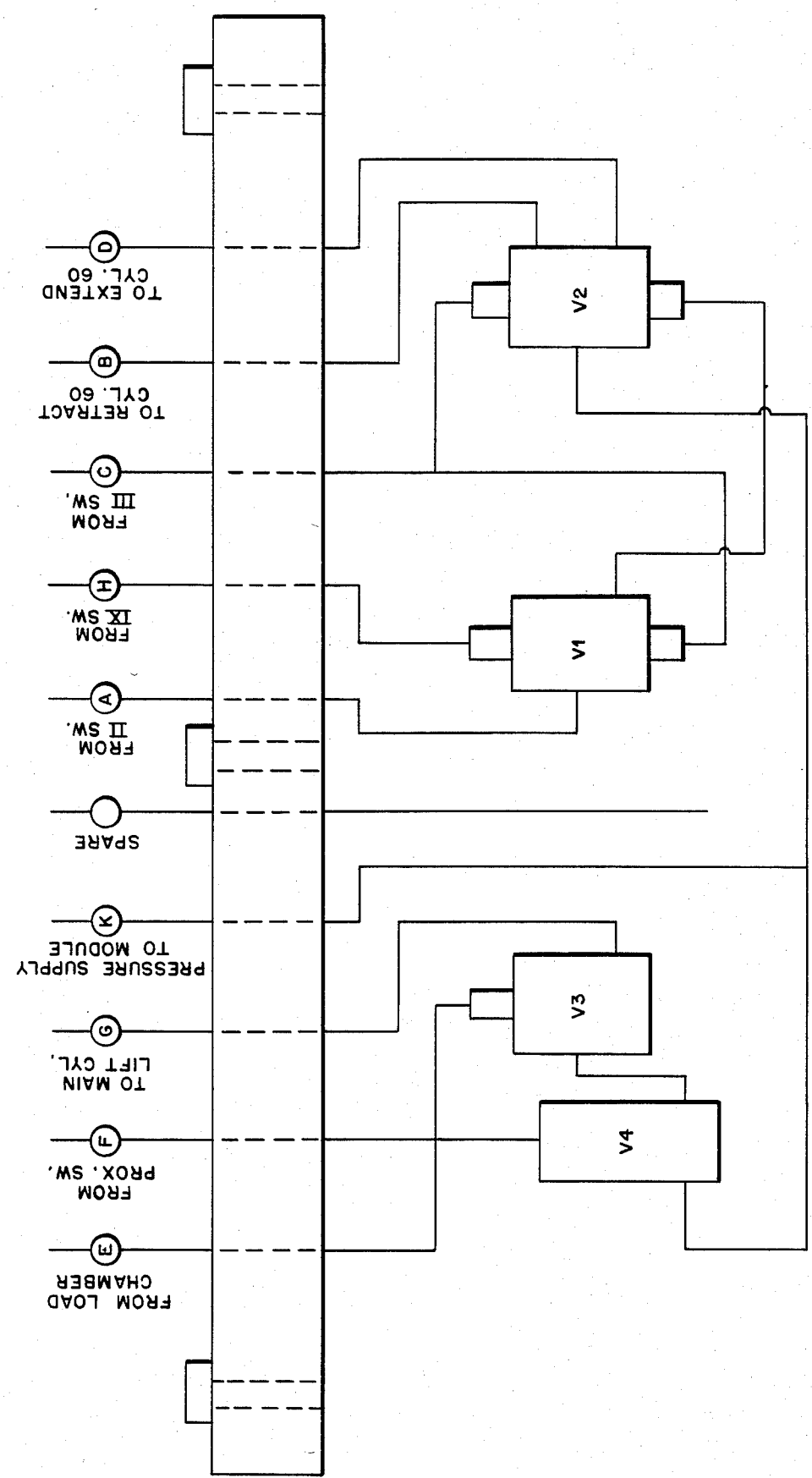
FIG. 29 is a schematic view of the control module.

Attention will now be directed to the control system for the overall assembly 10. Note FIG. 26 in particular. Basically, the invention proposes a fluid or pneumatic control system utilizing switches, preferably in the nature of pilot valves subject to a low pressure source of fluid, to provide control signals through control terminals. The control terminals are in the nature of ports, in a base or support bar 170, communicating, through control valves, with the several fluid motors for sequential operation of the case packer. The control terminals and associated control valves are mounted on the base with the assembly being in the nature of an elongated control manifold or module 170 replaceable as a unit and simply mounted by three mounting bolts. The assembly base 170 is preferably removably mounted on the near side panel 32 of the accumulator 16, thus allowing for a simplified servicing or replacement thereof.

The pressurized air for the system is introduced through one or more main lines 172 along which are provided a main flow controlling air valve 174 and appropriate filters, regulator and lubricator, all as generally illustrated at 176.

Following the desired sequence of operation, as the cans 14 move along the accumulator 16, one of the two lanes, defined by the divider 48 between the two conveyor belts 28, receives and retains an allotted number of cans 14, two in the illustrated example, with the leading can engaged against and held by the retractable stop 50. It is to be appreciated that either of the lanes can constitute the "first lane" by a selective introduction of the cans 14 primarily onto the lane-defining belt 28 associated with the chosen lane. Full movement of the initially introduced cans into the desired lane, the near lane in the illustration, is effected upon engagement of the leading cans 14 with the divider rail 48.

Subsequent to reception of a predetermined number of cans 14 in the first or near lane, such occurring when the last container projects upstream beyond the can dividing and guiding divider rail 48 by approximately one half the diameter of the can, the following cans 14 deflect or cam off the last can 14 in lane one and move into lane two, or, as illustrated, the far lane defined by the far belt 28. The initial can 14 in lane two contacts and actuates switch I which is in series with and in turn arms or activates switch II, upstream therefrom, for contact and actuation by a second can entering the second lane. The switches I and II will preferably be mounted on an elongated rail 178, positioned on the far side panel 32, for adjustment therealong for the accommodation of cans or other products of differing sizes.

Upon engagement of switch II by a following can 14, the corresponding control terminal A is signalled and, assuming the table 112 is in its lowered position, a control signal sent through valve V1 to Valve V2, allowing passage of line pressure from terminal K to terminal B to operate a fluid motor, comprising double acting cylinder unit 60, for a rotation of the belt underlying shaft 58 and a retraction of the stop lugs 50 and 52. Upon retraction of the stop lugs 50 and 52, the two lanes or rows of grouped cans 14 are carried forward and transferred to the moving infeed belt 54. As an alternative to switches I and II, a fluid logic device capable of counting to two can be used. It will be appreciated that the specific manner of grouping the cans, loading the first lane to its predetermined capacity prior to introducing the following cans into the second lane, assures a full group when the switch or switches in the second lane are triggered.

The forwardmost can 14 in the far or second lane moves on to the infeed belt 54 and contacts switch III which signals control terminal C which in turn sends a control signal to control valve V2 to communicate terminal D with line pressure to retract the cylinder unit 60 and reposition the stop lugs 50 and 52. It is to be appreciated that the position of the switch III is sufficiently downstream to allow for a clearing of the preselected number of cans 14 in the row. This, in the illustrated example, consists of two cans.

The four cans 14 released from the stacking area 46 are, through the action of the moving infeed belt 54, moved into the loading or packing chamber and into supported engagement on the support panels or flaps 96. It will be appreciated that the substantially greater friction of the belt 54, as compared to the belts 28, and the incline of the supporting surfaces of the flaps 96 which, as noted in FIG. 21, substantially reduces the area of contact between the cans and the support flaps 96, contribute to a rapid and complete loading of the grouped cans 14 in the loading chamber. The two rows of cans 14, when introduced fully into the loading chamber, engage against switch actuating pivotally mounted levers 178 and 180. The associated switches IV and V are actuated by a slight pivotal movement of the respective levers 178 and 180 in response to engagement of the two rows of cans 14 thereagainst. Noting FIG. 6 in particular, an adjustable stop or abutment 182 is provided on a vertical partition or structural panel 184 immediately behind each of the levers 178 and 180 to vary the degree of pivotal movement of these levers and thus control the position of the grouped cans 14 within the loading chamber and on the support flaps 96. With continued reference to FIG. 6, the upper portion of each of the levers 178 and 180 includes an adjustable contact so related to the associated switch IV or V as to actuate or open the switch in response to the can produced pivotal movement of the lever 178 or 180. The switches IV and V are in series whereby actuation of both switches is required to signal control terminal E, and valve V3 controlled thereby, that the group of cans 14 is within the loading chamber. The proper positioning of an empty box 18 within the loading chamber 86 and on the support rollers 116 of the table 112 is determined by the approach of the box 18 to a proximity switch VI mounted on the table wall 120 remote from the box introducing conveyor 22. Actuation of the proximity switch VI signals control terminal F which in turn, through valve V4, communicates control valve V3 and control terminal G with line pressure. Assuming control terminal E has been signalled in response to presence of the cans within the loading chamber, control terminal G signals through a reversing servo valve XV to pressurize the lower chamber of the lifting ram 128, for example through line 185, to elevate the table 112 with the empty box thereon. As previously described, elevation of the support table 112, through camming rods 132, selectively pivot the can supporting flaps or panels 96 to allow for a direct downward discharge of the cans into the elevated carton.

As pressurized fluid is directed to the lift cylinder or ram 128 during the lift cycle, a metered flow of air is irected to a fluidic timing circuit, comprised of flow control valve means VII and fluid reservoir VIII, providing a timing sequence, to reverse valve XV to introduce the pressurized fluid through line 186 to the upper portion of the lift cylinder 128 and thereby effect downward movement of the table and a lowering of the loaded carton.

A particularly significant feature of the above described fluidic timing circuit is its ability to function as a safety device. More specifically, should there by any obstruction in the loading area, for example the hand of an operator of the apparatus, the additional load impeding the upward travel of the table will immediately enhance the flow through the flow control valve VII into the reservoir or volume chamber VIII and thus cause a reversing of the servo valve XV and a retraction of the lifting ram 128. If, on the contrary, an upper limit switch were used to detect the upward position of the ram driven table, any accidental cycling of the apparatus, or cycling of the apparatus when an obstruction is present within the loading chamber, substantial personal, equipment and/or product damage could result. With the system of the present invention, however, little or no damage would result and operation of the equipment will automatically come to a halt until the encountered problem is remedied.

It is considered significant that the vertical movement of the carton supporting table can, through the adjustable camming rods 132, by synchronized with the pivoting of the support flaps 96 to accommodate a variety of different products. For example, when the apparatus is used to load gallon paint cans, the flaps need only be cammed open to a point at which the weight of the cans themselves overcome the biasing force and move into the elevated carton. When dealing with heavy loads, it is also desirable to effect the deposit of the cans into the carton at either the uppermost position of the carton or at just the point at which the carton starts its descent, thereby providing for a "soft landing" of the cans in the carton. It will be appreciated that the spring loaded nature of the flaps 96, as well as the flaps 142 will contribute to a smooth movement of the cans into the carton. Similarly, interference between any bails or other projections on the cans is to a large degree eliminated by the divider panel which basically maintains contact with the two rows of cans until the cans are, for the most part, received within the underlying carton.

When dealing with light products, the camming rods 132 may be adjusted to completely open the support flaps 96 and retain the flaps open for a period of time sufficient to allow for a complete discharge of the "light" products into the underlying carton. This may be assisted by an adjustment in the timing cycle to momentarily retain the table, and carton thereon, at its uppermost position.

As will be appreciated from a review of the carton positioning procedure, until such time as the carton is loaded, the carton will not possess sufficient weight to discharge from the loaded chamber. This in turn will prevent the introduction of a following carton and thus avoid the cycling of the apparatus with an empty carton.

The table 112, in its elevated position, disengages contact with switch IX which sends a signal to a control switch on the carton assembler to produce another box. Switch IX also signals through control terminal H to shift valve V1 and reset for a new cycle to release the grouped cans to the input belt. Switch IX also shifts valve I to prevent line pessure to IV and V. Valve I, while mounted adjacent the discharge conveyor 24, may be mounted on the control panel or module 170. Further cycles ar prevented by interruption of the load circuit by valve I. The circuit interrupt by valve I is removed upon actuation of switch X by a filled carton moving along the discharge conveyor 24. The switch X is positioned a sufficient distance along the length of the conveyor to ensure a complete clearing of the carton from the load chamber prior to actuation of switch X. This reset switch X, opens valve I and supplies pressure to the can sensing switch IV through manual safety toggle switch XI.

The control system is provided with manual overrides to terminate the supply of air to the equipment, exhaust air from the equipment, and also interrupt the electrical control system to the belt driving power unit. Such overrides, in addition to switch XI, include a toggle air switch XII to the conveyor control, and a push-button air switch XIII to the box maker.

Figure 31:
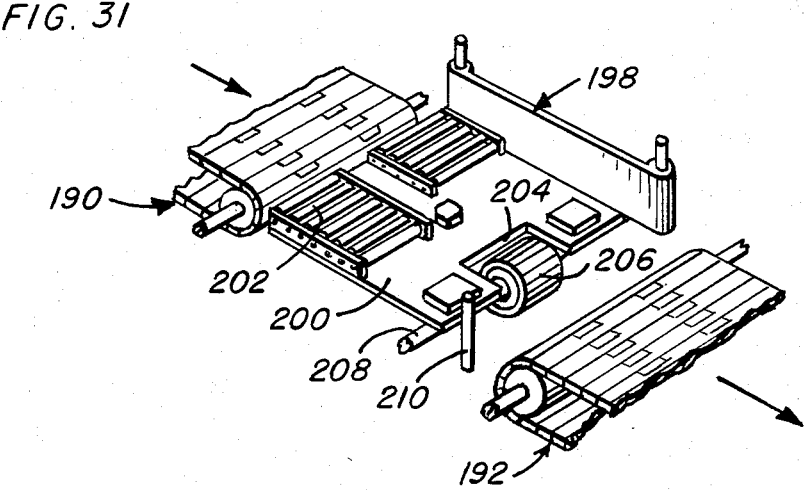
FIG. 31 details a modified support table, within the loading chamber, as proposed for use with the aligned carton introducing conveyor and discharge conveyor.
Figure 5:
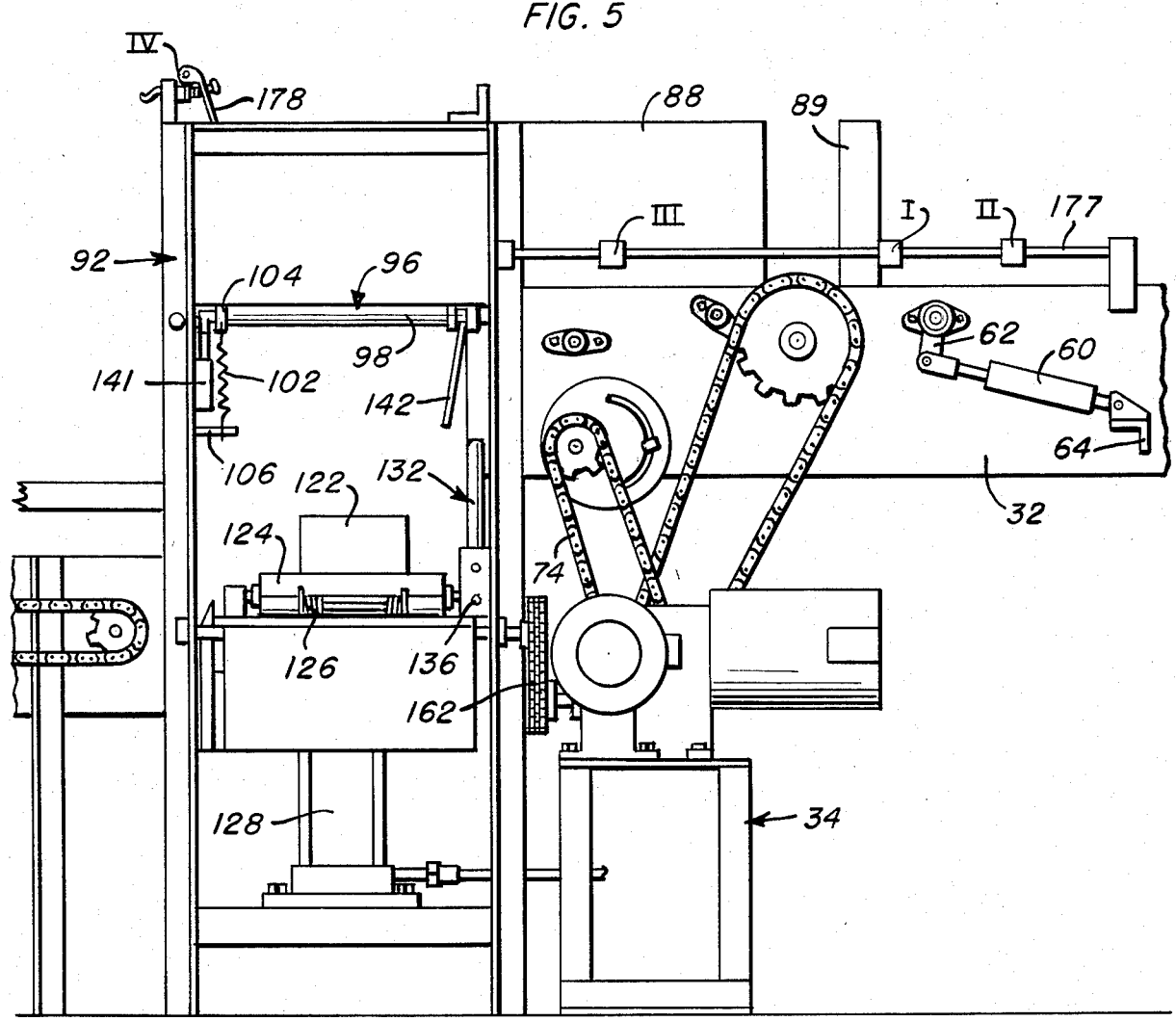
FIG. 5 is a rear elevational view.
Figure 30:
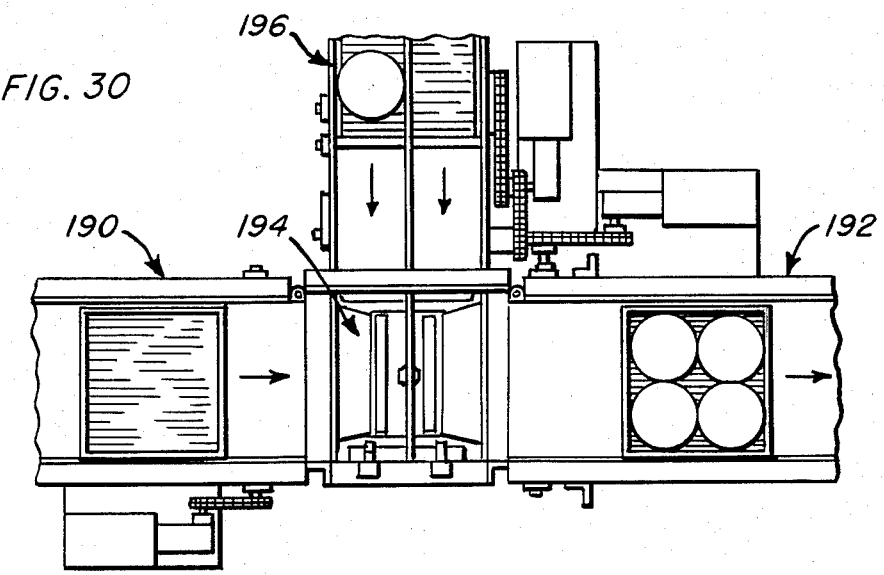
FIG. 30 is a top plan view illustrating an alternative lay-out of the case packer wherein the carton introducing conveyor is in alignment with the carton discharge.

While the apparatus, as described above, emphasizes the introduction of the empty cartons at right angles to the discharge of the loaded cartons, it is to be appreciated that the present invention is intended to also encompass the introduction of empty cartons along a path and through the side of the loading apparatus directly opposite from and in alignment with the carton discharge. Such an arrangement is generally illustrated in FIGS. 30 and 31 wherein the carton feeding or introducing conveyor 190 is in direct alignment with the discharge conveyor 192 for the loaded cartons. The conveyors 190 and 192 are positioned to the opposite sides of the central loading chamber 194 and at right angles to the can introducing apparatus 196.

Noting FIG. 31 in particular, the ram-driven vertically adjustable table 198 includes a base panel 200 upon which are mounted a series of support rollers 202 which are positioned on the base panel 200 immediately inward of the discharge end of the carton introducing conveyor 190. These rollers 202 extend transversely of the direction of feed of the conveyor 190 and are free rolling to receive and allow for an inward movement of the cartons from conveyor 190 to the table 198.

The opposite side of the table base panel 200 is centrally noched, as at 204, to accommodate drive roller 206 which is mounted on a drive shaft 208 positioned below table panel 200 and power driven in any appropriate manner. The projection of the drive roller above the top of the base panel is such as to engage and support the leading portion of an introduced carton. In order to properly position the incoming empty carton on the vertically adjustable table 198, an appropriate spring loaded stop 210 is provided. This stop 210 is positioned to preclude discharge of the empty carton onto the discharge conveyor 192. Basically, the friction generated between the surface of the drive roller 206 and the bottom of the empty carton is insufficient to propel the carton through the spring loaded resistance of the stop 210.

Upon a proper centering of the empty carton on the table 198, the apparatus proceeds as generally previously discussed. Basically, the table elevates the carton, the grouped cans are discharged into the carton and the table lowered. Upon the lowering of the table to its lowered position wherein the carton again engages the constantly driven roller 206, the substantial increase in the weight of the carton, as now loaded, provides for a positive frictional engagement with the surface of the drive roller 206 which is sufficient to move the loaded carton through the spring-loaded stop 210, the stop pivoting downwardly as the loaded carton moves thereover to the discharge conveyor 192.

I claim:

1. A case packing system comprising a product introducing accumulator, first and second conveyor means, said accumulator including said first conveyor means having an upstream intake portion for receiving and moving multiple similar products, a downstream grouping area for receiving and grouping said products in multiple parallel rows, releasable abutment means positioned for retaining the grouped products for a lateral camming of following products from a completed row to an uncompleted row, means for selective releasing said abutment means and the grouped products retained thereby, said second conveyor providing a continuously unidirectional moving product support surface infeed means immediately downstream of said accumulator for receiving and propelling said grouped products as a discrete group in a continued downstream direction, a loading station downstream of said infeed means, said infeed means propelling the grouped products into said loading station, said loading station including a retractable support for the introduced products, a vertically shiftable table below said support, case conveyor means communicating with said locking station for the selective introduction of empty cases onto said table, means for retracting said support product support, upon the positioning of an empty case therebelow, for the discharge of grouped products thereinto, mean for discharging a loaded case from said loading station, and discharge conveyor means receiving a discharging case and moving said case outward relative to said loading station.

2. The packing system of claim 1 wherein the releasable abutment means retaining the grouped products comprises a stop lug positioned within the downstream path of movement of each row of products, said lugs being longitudinally offset from each other and mounted for synchronous movement, fluid motor means operatively connected to said lugs for selective retraction of said lugs, and switch means activated upon introduction of a predetermined number of products within said grouping area for an actuation of said fluid motor means and a retraction of said abutment lugs.

3. The packing system of claim 2 wherein the conveyor means of said accumulator comprises a pair of coplanar laterally spaced coextensive endless belts, said product grouping area including a divider rail mounted between the conveyor belts at the downstream portion thereof and defining a pair of laterally spaced parallel lanes, said divider rail projecting above said belts and defining an abutment end for laterally directing conveyor propelled products to one rail-defining lane to a first side of the rail, one of said abutment lugs being associated with each of the two rail defining lanes, the position of the abutment lug in the lane toward which the products are directed by the divider rail being located, relative to the product engaging end of the rail, a distance sufficient to accommodate multiple products within the formed lane with the last product received therein positioned to have a portion thereof upstream of the divider rail for a lateral camming of following products into the second of the defined lanes.

4. The system of claim 3 wherein said infeed means comprising an endless conveyor with a product receiving surface having an enhanced frictional resistance, relative to the accumulator conveyor means, to receive the grouped products therefrom and move said grouped products onto the retractable support of the loading station.

5. The system of claim 4 wherein the retractable support comprises a pair of opposed flaps selectively moveable between a product receiving and supporting horizontal position and a product discharging downwardly directed generally vertical position, and means releasably retaining said flaps in said horizontal position.

6. The system of claim 5 wherein the table in said loading station is vertically adjustable subsequent to the introduction of a case thereon.

7. The system of claim 6 including cam follower means on said flaps and cam means on said table, said cam means on said table engaging and pivotally moving said flaps from the horizontal product receiving position to the vertical product discharging position in response to an elevation of said table.

8. The system of claim 7 wherein said cam means are vertically adjustable to vary the relationship between the vertical movement of the table and the pivotal movement of the product supporting flaps.

9. The system of claim 8 wherein said table includes a case receiving surface defined by a plurality of parallel laterally spaced elongated support rollers mounted for free rotation, and drive roll means mounted beneath said table for selectively driving a roller supported case in a manner to effect a lateral movement of a roller supported case toward said discharge conveyor means.

10. The system of claim 9 including a retractable case retainer selectively precluding discharge of an empty case from the roller supporting surface of said table to the discharge conveyor means, and means resisting retraction of said retainer with a force sufficient to overcome the force of an empty case engaging thereagainst by the selective driving of the case by the drive roll means, and with a force less than that generated by the selective driving engagement with of a product-filled case.

11. The system of claim 10 wherein said drive roll means comprises a driven roller underlying selected ones of said support rollers, the table surface-defining support rollers engaging said driven roller only in the lowered position of said table.

12. The system of claim 11 including means sensing the presence of a group of products within the loading station, means sensing the presence of an empty case within said loading station and means for vertically raising and lowering said table in response to the sensed presence of a group of products and an empty case.

13. The system of claim 12 including a divider panel downstream of said divider rail and overlying said infeed belt and said product supporting flaps, said divider panel being of a substantially greater height than said divider rail and defining a leading vertically elongated abutment edge for positioning engagement with products moving thereby.

14. The system of claim 13 including product aligning means projecting vertically adjacent said one rail-defined lane to one side of the lane, said product aligning means being immediately adjacent the path of movement of the products introduced into this lane to allow passage of the products while engaging any projections there to rotate such products and position said projections inboard.

15. The packing system of claim 14 including abutment positioning switch means aligned within the path of movement of a group of products moved by said infeed belt for activation by the moving group of products and actuation of the fluid motor for a repositioning of the abutment lugs and a retention of subsequently introduced products in the grouping area.

16. The system of claim 8 wherein a pair of limited movement flaps are mounted at right angles to the product supporting flaps, said limited movement flaps being downwardly and inwardly inclined and mounted for limited spring biased movement upon engagement by downwardly discharging products.

17. The system of claim 16 including a second pair of opposed limited movement flaps mounted beneath the product-supporting flaps, said second pair of limited movement flaps being downwardly and inwardly inclined for a guidance of downwardly discharging products below the product-supporting flaps.

18. The system of claim 10 wherein said drive roll means comprises a driven roller positioned laterally of said support rollers and presenting a peripheral surface which defines a portion of said case receiving surface for direct engagement with a case.

19. The system of claim 2 wherein said switch means includes first switch means within said grouping area signaling the introduction of a predetermined number of products and activating fluid motor means releasing said group of products for downstream travel on said infeed belt, second switch means positioned for activation by grouped products moved by said infeed belt for actuation of said fluid motor to limit following products, third switch means in said loading chamber for sensing receipt of a full product group therein, fourth switch means for sensing receipt of empty case within said loading chamber, fifth and sixth switch means for activating a loading sequence for deposit of the grouped product into the case, and seventh switch means associated with said means for effecting discharge of a product-loaded case for sensing discharge of a loaded case.

20. A case packing system comprising a product introducing accumulator, said accumulator including conveyor means having an upstream intake portion for receiving and moving multiple similar products, said conveyor means of said accumulator comprising a pair of coplanar laterally spaced coextensive endless belts, a downstream grouping area for receiving and grouping said products in multiple parallel rows, releasable abutment means retaining the grouped products, said releasable abutment means retaining the grouped products comprising a stop lug positioned within the downstream path of movement of each row of products, said lugs being longitudinally offset form each other and mounted on a common shaft, said product grouping area including a divider rail mounted between the conveyor belts at the downstream portion thereof and defining a pair of laterally spaced parallel lanes, said divider rail projecting above said belts and defining an abutment end for laterally directing conveyor propelled products to one rail-defining lane to a first side of the rail, one of said abutment lugs being associated with each of the two rail defining lanes, the position of tha abutment lug in the lane toward which the products are directed by the divider rail being located, relative to the product engaging end of the rail, a distance sufficient to accommodate multiple products within the formed lane with the last product received therein positioned to have a portion thereof upstream of the divider rail for a lateral camming of following products into the second of the defined lanes, means for selective releasing said abutment means and the grouped products retained thereby and comprising fluid motor means operatively engaged with said shaft for a selective rotation thereof and a retraction of said lugs, and switch means activated upon introduction of a predetermined number of products within said grouping area for an actuation of said fluid motor means and a retraction of said abutment lugs, infeed means immediately downstream of said accumulator for receiving and propelling said grouped products in a continued downstream direction, a loading station downstream of said infeed means, said infeed means propelling the grouped products into said loading station, said loading station including a retractable support for the introduced products, a vertically shiftable table below said support, case conveyor means communicating with said loading station for the selective introduction of empty cases onto said table, means for retracting said product support, upon the positioning of an empty case therebelow, for the discharge of grouped products thereinto, means for discharging a loaded case from said loading station, and discharge conveyor means receiving a discharging case and moving said case outward relative to said loading station.

21. The system of claim 20 wherein said infeed means comprising an endless conveyor with a product receiving surface having an enhanced frictional resistance, relative to the accumulator conveyor means, to receive the grouped products therefrom and move said grouped products onto the retractable support of the loading station.

22. The system of claim 21 wherein the retractable support comprises a pair of opposed flaps selectively moveable between a product receiving and supporting horizontal position and a product discharging downwardly directed generally vertical position, and means releasably retaining said flaps in said horizontal position.

23. The system of claim 22 wherein the table in said loading station is vertically adjustable subsequent to the introduction of a case thereon.

24. The system of claim 23 including cam follower means on said flaps and cam means on said table, said cam means on said table engaging and pivotally moving said flaps from the horizontal product receiving position to the vertical product discharging position in response to an elevation of said table.

25. The system of claim 24 wherein said cam means are vertically adjustable to vary the relationship between the vertical movement of the table and the pivotal movement of the product supporting flaps.

26. The system of claim 25 wherein said table includes a case receiving surface defined by a plurality of parallel laterally spaced elongated support rollers mounted for free rotation, and drive roll means mounted beneath said table for selectively driving a roller supported case in a manner to effect a lateral movement of a roller supported case toward said discharge conveyor means.

27. The system of claim 26 including a retractable case retainer selectively precluding discharge of an empty case from the roller supporting surface of said table to the discharge conveyor means, and means resisting retracting of said retainer with a force sufficient to overcome the force of an empty case engaging thereagainst by the selective driving of the case by the drive roll means, and with a force less than that generated by the selective driving engagement with of a product-filled case.

28. The system of claim 27 wherein said drive roll means comprises a driven roller underlying selected ones of said support rollers, the table surface-defining support rollers engaging said driven roller only in the lowered position of said table.

29. The system of claim 28 including means sensing the presence of a group of products within the loading station, means sensing the presence of an empty case within said loading station and means for vertically raising and lowering said table in response to the sensed presence of a group of products and an empty case.

30. The system of claim 29 including a divider panel downstream of said divider rail and overlying said infeed belt and said product supporting flaps, said divider panel being of a substantially greater height than said divider rail and defining a leading vertically elongated abutment edge for positioning engagement with products moving thereby.

31. The system of claim 30 including product aligning means projecting vertically adjacent said one rail-defined lane to one side of the lane, said product aligning means being immediately adjacent the path of movement of the products introduced into this lane to allow passage of the products while engaging any projections there to rotate such products and position said projections inboard.

32. The packing system of claim 31 including abutment positioning switch means aligned within the path of movement of a group of products moved by said infeed belt for activation by the moving group of products and actuation of the fluid motor for a repositioning of the abutment lugs and a retention of subsequently introduced products in the grouping area.

33. The system of claim 25 wherein a pair of limited movement flaps are mounted at right angles to the product supporting flaps, said limited movement flaps being downwardly and inwardly inclined and mounted for limited spring biased movement upon engagement by downwardly discharging products.

34. The system of claim 33 including a second pair of opposed limited movement flaps mounted beneath the product-supporting flaps, said second pair of limited movement flaps being downwardly and inwardly inclined for a guidance of downwardly discharging products below the product-supporting flaps.

35. The system of claim 27 wherein said drive roll means comprises a driven roller positioned laterally of said support rollers and presenting a peripheral surface which defines a portion of said case receiving surface for direct engagement with a case.

36. A case packing system comprising a product introducing accumulator, first and second conveyor means, said accumulator including said first conveyor means having an upstream intake portion for receiving and moving multiple similar products, a downstream grouping area for receiving and grouping said products in sequentially completed multiple parallel rows comprising a first row and a final row, releasable abutment means retaining the grouped products, means responsive to completion of said completed final row for selective releasing said abutment means and the grouped products retained thereby, said second conveyor providing a continuously unidirectional moving product support surface infeed means immediately downstream of said accumulator for receiving and propelling said grouped products as a discrete group in a continued downstream direction, a loading station downstream of said infeed means, said infeed means propelling the grouped products into said loadng station, said loading station including a retractable support for the introduced products, a vertically shiftable table below said support, case conveyor means communicating with said loading station for the selective introduction of empty cases onto said table, means for retracting said product support, upon the positioning of an empty case therebelow, for the discharge of grouped products thereinto, means for discharging a loaded case from said loading station, and discharge conveyor means receiving a discharging case and moving said case outward relative to said loading station.

* * * * *